(12) United States Patent
Kim et al.

(10) Patent No.: US 11,334,311 B2
(45) Date of Patent: May 17, 2022

(54) ELECTRONIC DEVICE AND METHOD FOR SHARING SCREEN

(71) Applicant: Samsung Electronics Co., Ltd., Suwon-si (KR)

(72) Inventors: Hyunkyoung Kim, Seoul (KR); Woonghee Park, Seoul (KR); Saetbyeol Lee, Suwon-si (KR); Bongkyu Kim, Suwon-si (KR); Tae Hyung Kim, Yongin-si (KR); Hyung-Jun Ahn, Seongnam-si (KR); Kwang-Yong Lee, Suwon-si (KR); Sang-Hun Lee, Gyeongsan-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 17/234,434

(22) Filed: Apr. 19, 2021

(65) Prior Publication Data
US 2021/0240428 A1   Aug. 5, 2021

Related U.S. Application Data

(63) Continuation of application No. 16/486,640, filed as application No. PCT/KR2018/001924 on Feb. 14, 2018, now Pat. No. 10,983,749.

(30) Foreign Application Priority Data

Feb. 17, 2017 (KR) .......................... 10-2017-0021856

(51) Int. Cl.
*G06F 3/14* (2006.01)
*G06F 3/04817* (2022.01)
(Continued)

(52) U.S. Cl.
CPC .......... *G06F 3/1454* (2013.01); *G06F 3/0482* (2013.01); *G06F 3/0484* (2013.01); *G06F 3/04817* (2013.01)

(58) Field of Classification Search
None
See application file for complete search history.

(56) References Cited

U.S. PATENT DOCUMENTS 10,983,749 B2    4/2021  Kim et al.
2014/0199947 A1* 7/2014  Jung ..................... G06F 3/1454
                                                 455/68

(Continued)

FOREIGN PATENT DOCUMENTS

EP        2 680 134         1/2014
KR    10-2011-0085189       7/2011
(Continued)

OTHER PUBLICATIONS

International Search Report for PCT/KR2018/001924 dated May 17, 2018, 4 pages.
(Continued)

*Primary Examiner* — Aneeta Yodichkas

(57) ABSTRACT

An example method of an electronic device according to various embodiments of the present disclosure may include indicating that a first screen related to a first application operating in a background state is being displayed in an external electronic device, connected to the electronic device, based on data transmitted from the electronic device; and displaying an object floating on a second screen being displayed on the electronic device.

20 Claims, 26 Drawing Sheets

(51) Int. Cl.
 *G06F 3/0482* (2013.01)
 *G06F 3/0484* (2022.01)

(56) References Cited

U.S. PATENT DOCUMENTS

| | | |
|---|---|---|
| 2014/0240440 A1 | 8/2014 | Seo et al. |
| 2015/0061970 A1 | 3/2015 | Kim et al. |
| 2016/0110152 A1 | 4/2016 | Choi et al. |
| 2016/0253142 A1 | 9/2016 | Choi et al. |
| 2017/0168667 A1* | 6/2017 | Jeon ............... H04N 21/43615 |
| 2017/0237930 A1 | 8/2017 | Kim et al. |

FOREIGN PATENT DOCUMENTS

| | | |
|---|---|---|
| KR | 10-2014-0093451 | 7/2014 |
| KR | 10-2014-0137642 | 12/2014 |
| KR | 10-2015-0009103 | 1/2015 |
| KR | 10-2016-0045370 | 4/2016 |
| KR | 10-2016-0105242 | 9/2016 |

OTHER PUBLICATIONS

Written Opinion of the ISA for PCT/KR2018/001924 dated May 17, 2018, 7 pages.
Extended European Search Report dated Dec. 12, 2019 in European Patent Application No. 18754308.7.
Kim et al., U.S. Appl. No. 16/486,640, filed Aug. 16, 2019.
Communication pursuant to Article 94(3) EPC dated Aug. 18, 2021 in counterpart European Application No. EP18754308.7.

* cited by examiner

ELECTRONIC DEVICE AND METHOD FOR SHARING SCREEN

CROSS-REFERENCE TO RELATED APPLICATIONS

This application is a continuation of U.S. application Ser. No. 16/486,640, filed Aug. 16, 2019, now U.S. Pat. No. 10,983,749, which is the U.S. national phase of International Application No. PCT/KR2018/001924 filed Feb. 14, 2018 which designated the U.S. and claims priority to KR Patent Application No. 10-2017-0021856 filed Feb. 17, 2017, the entire contents of which are hereby incorporated by reference.

TECHNICAL FIELD

The disclosure relates to an electronic device, and more particularly to an electronic device for sharing a screen and a method thereof.

BACKGROUND ART

With the development of digital technology, electronic devices having mobility and capable of processing communication and/or information, such as mobile communication terminals, Personal Assistants (PDAs), electronic notebooks, smart phones, tablet Personal Computers (PCs), or wearable devices, have been supplied. The electronic devices provide various services of taking a picture, finding a route, or providing a web interface as well as services of making a voice call and sending a text message.

Meanwhile, due to the development of communication technology, access to content, such as photos or videos, has increased, and thus various technologies for sharing content are being developed. For example, an electronic device having screen-sharing technology for displaying a screen associated with the current electronic device on another electronic device is being developed.

SUMMARY

In order to provide a greater degree freedom to a user of an electronic device which shares a screen with another electronic device, casting technology for providing a display screen which is different from the display screen of the electronic device to the other electronic device is being supplied.

However, the electronic device having the casting technology does not display the state of the screen displayed on the display of the other electronic device based on data transmitted from the electronic device through the display of the electronic device. Accordingly, a method of displaying the state of the screen displayed on the display of the other electronic device through the display of the electronic device on the basis of the data transmitted from the electronic device is needed.

Therefore, various embodiments may provide an electronic device and a method for, when the screen is displayed through the display of the other electronic device, displaying an object indicating the screen display state of the other electronic device on the display of the electronic device.

The technical subjects pursued in the disclosure may not be limited to the above mentioned technical subjects, and other technical subjects which are not mentioned may be clearly understood, through the following descriptions, by those skilled in the art of the disclosure.

In accordance with an aspect of the disclosure, an electronic device is provided. The electronic device includes: a memory configured to store instructions; a display unit; a communication unit; and at least one processor electrically connected to the memory and configured to display an object floated on a first screen being displayed on the electronic device and having a first shape, transmit data for displaying the first screen on an external electronic device to the external electronic device, receive an input on the displayed object, and execute the stored instructions in order to display a second screen while transmission of the data is maintained in response to switching of the first application related to the first screen from a foreground state to a background state.

In accordance with another aspect of the disclosure, a method by an electronic device is provided. The method includes: displaying an object having a first shape and floated on a first screen being displayed on the electronic device; transmitting data for displaying the first screen on an external electronic device to the external electronic device; displaying the object having a second shape changed from the first shape in response to reception of an input on the displayed object; and displaying a second screen while transmission of the data is maintained in response to switching of a first application related to the first screen from a foreground state to a background state.

In accordance with another aspect of the disclosure, an electronic device is provided. The electronic device includes: a memory configured to store instructions; a display unit; a communication unit; and at least one processor electrically connected to the memory and configured to execute the stored instructions in order to indicate that a first screen related to a first application executed in a background state is being displayed on an external electronic device connected to the electronic device based on data transmitted from the electronic device and to display an object floated on a second screen being displayed on the electronic device.

In accordance with another aspect of the disclosure, a method by an electronic device is provided. The method includes: indicating that a first screen related to a first application executed in a background state is being displayed on an external electronic device connected to the electronic device based on data transmitted from the electronic device and displaying an object floated on a second screen being displayed on the electronic device.

An electronic device and a method according to various embodiments provide an object floated on a screen being displayed within the electronic device so as to control the screen independently from an external electronic device linked to the electronic device.

DETAILED DESCRIPTION OF EXAMPLE EMBODIMENTS

Figure 1:
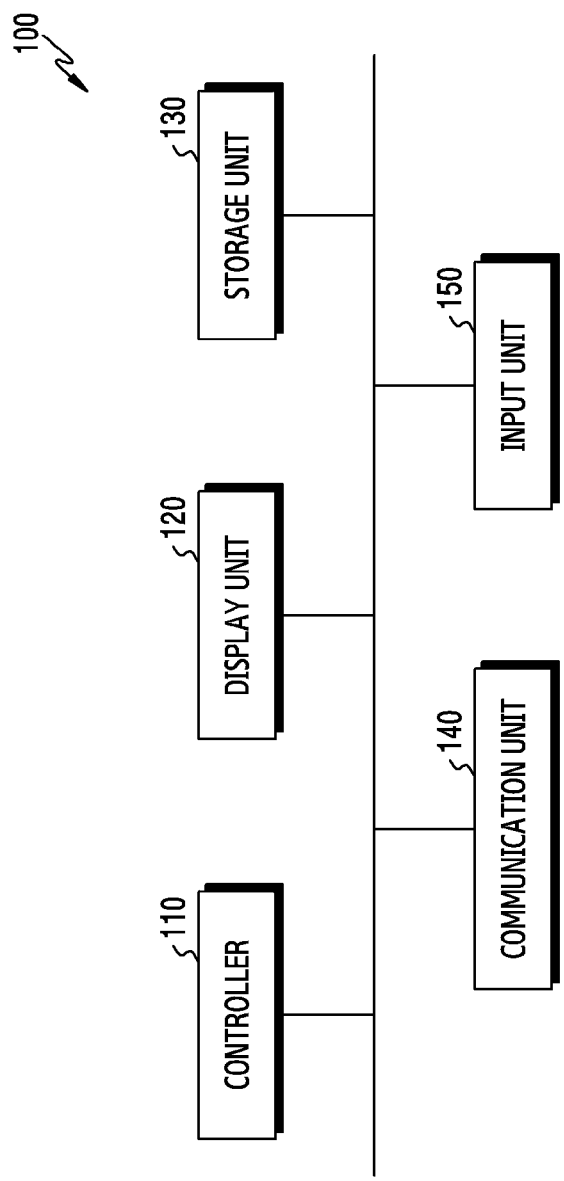
FIG. 1 illustrates an example of the functional configuration of an electronic device according to various embodiments.

Hereinafter, various embodiments of the disclosure will be described with reference to the accompanying drawings. The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context. As used herein, the expression "A or B" or "at least one of A and/or B" may include all possible combinations of items enumerated together. The expression "a first", "a second", "the first", or "the second" may modify various components regardless of the order and/or the importance, and is used merely to distinguish one element from any other element without limiting the corresponding elements. When an element (e.g., first element) is referred to as being "(functionally or communicatively) connected," or "directly coupled" to another element (second element), the element may be connected directly to the another element or connected to the another element through yet another element (e.g., third element).

The expression "configured to" as used in various embodiments of the disclosure may be interchangeably used with, for example, "suitable for", "having the capacity to", "designed to", "adapted to", "made to", or "capable of" in terms of hardware or software, according to circumstances. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

An electronic device according to various embodiments of the disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit). In some embodiments, the electronic device may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

In other embodiments, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.). According to some embodiments, an electronic device may include at least one of a part of furniture or a building/structure, an electronic board, an electronic signature receiving device, a projector, and various types of measuring instruments (e.g., a water meter, an electric meter, a gas meter, a radio wave meter, and the like). In various embodiments, the electronic device may be flexible, or may be a combination of one or more of the aforementioned various devices. The electronic device according to one embodiment of the disclosure is not limited to the above described devices. In the disclosure, the term "user" may indicate a person using an electronic device or a device (e.g., an artificial intelligence electronic device) using an electronic device.

FIG. 1 illustrates an example of the functional configuration of an electronic device according to various embodiments.

Referring to FIG. 1, an electronic device 100 may include a controller 110, a display unit 120, a storage unit 130, a communication unit 140, and/or an input unit 150.

The controller 110 may control the overall operation of the electronic device 100. The controller 110 may execute applications providing an Internet browser, a game, and a video. In some embodiments, the controller 110 may include a single processor core or a plurality of processor cores. For example, the controller 110 may include multi-core such as dual-core, quad-core, hexa-core, and the like. According to embodiments, the controller 110 may further include an internal or external cache memory.

The controller 110 may receive commands from other elements of the electronic device 100, analyze the received commands, and perform calculations or process data according to the analyzed commands.

The controller 110 may process data or a signal made or generated by an application. For example, the controller 110 may make a request for an instruction, data or a signal to the storage unit 130 in order to execute or control an application. The controller 110 may record (or store) or update the instruction, data, or signal in the storage unit 130 in order to execute or control the application.

The controller 110 may analyze and process a message, data, an instruction, or a signal received from the display unit 120, the communication unit 140, or the input unit 150. Further, the controller 110 may generate a new message, data, instruction, or signals based on the received messages, data, instructions, or signals. The controller 110 may provide the processed or generated message, data, instruction, or signals to the display unit 120. For example, when the electronic device 100 displays a screen through the display of another electronic device, the controller 110 may provide the processed or generated message, data, instruction, or signal to the display unit 120 in order to display an object indicating a screen display state of the other electronic device on the display unit 120.

All or part of the controller 110 may be electrically or physically coupled with other elements within the electronic device 100 (for example, the display 120, the storage unit 130, the communication unit 140, and/or the input unit 150).

According to embodiments, the controller 110 may include one or more processors. For example, the controller 110 may include an Application Processor (AP) that controls a higher-layer program such as an application, or may include a Communication Processor (CP) that performs control for communication.

Although not illustrated in FIG. 1, the controller 110 may further include a display management unit (display control unit) and a connection management unit (connection control unit).

In some embodiments, the display management unit may control display related to an object for a pin mode according to various embodiments. For example, the display management unit may control the display unit 120 to display the object for the pin mode on a currently displayed screen in response to establishment of communication between the other electronic device and the electronic device 100. In another example, the display management unit may configure an application related to the currently displayed screen as the pin mode in response to reception of the input on the object for the pin mode. In another example, the display management unit may control the display unit 120 to display a menu for performing various functions related to the pin mode in response to reception of the input on the object for the pin mode. In other words, in order to fix a screen displayed through the other electronic device regardless of whether the application is executed in a background state or a foreground state, the display management unit may control the configuration of the pin mode and perform various functions for controlling the display of the object for the pin mode.

In some embodiments, the connection management unit may control a connection related to the pin mode according to various embodiments. For example, the connection management unit may control the communication unit 140 to establish the connection with the other electronic device in order to share the screen displayed on the electronic device 100. In another example, the connection management unit may control the communication unit 140 to maintain the connection with the other electronic device. In another example, the connection management unit may control the communication unit 140 in response to reception of the input on the object for the pin mode.

According to various embodiments, the controller 110 may be configured to perform a method, a procedure, and/or operations proposed in this document.

The display unit 120 may output data or a signal. In some embodiments, the display unit 120 may display an image signal processed by the controller 110. For example, the display unit 120 may display a captured image or a still image. In another example, the display unit 120 may display a video or a camera preview image. In another example, the display unit 120 may display a Graphical User interface (GUI) to allow the user to interact with the electronic device 100.

The display unit 120 may be formed of a Liquid Crystal Display (LCD) or an Organic Light-Emitting Diode (OLED).

The storage unit 130 may store a control command code, control data, or user data for controlling the electronic device 100. For example, the storage unit 130 may include applications, an operating system (OS), middleware, and a device driver.

The storage unit 130 may include at least one of volatile memory and nonvolatile memory. The volatile memory may include a Dynamic Random Access Memory (DRAM), a Static RAM (SRAM), a Synchronous DRAM (SDRAM), a Phrase-change RAM (PRAM), a Magnetic RAM (MRAM), a Resistive RAM (RRAM), a Ferroelectric RAM (FeRAM), and the like. The nonvolatile memory may include Read- Only Memory (ROM), Programmable ROM (PROM), Electrically Programmable ROM (EPROM), Electrically Erasable ROM (EEPROM), flash memory, and the like.

The storage unit 130 may include a nonvolatile medium, such as a Hard Disk Drive (HDD), a Solid-State Disk (SSD), an embedded Multimedia Card (eMMC), and a Universal Flash Storage (UFS).

The communication unit 140 may have various communication functions (for example, wired communication and wireless communication (for example, cellular communication, Bluetooth, NFC, and Wi-Fi)) for communication between the electronic device 100 and at least one external electronic device. In other words, the communication unit 140 may establish communication between the electronic device 100 and at least one external electronic device. For example, the communication unit 140 may exchange traffic with at least one external electronic device through a wireless communication path or a wired communication path.

The input unit 150 may receive an indication (or an instruction), interaction, or data from the user. The input unit 150 may be a touch panel coupled with the display unit 120. The input unit 150 may sense a touch or a hovering input by a finger or a pen. The input unit 150 may include a sensor. The sensor may be independently attached to a touch panel of the input unit. The input received by the input unit 150 may have various forms. For example, the input received by the input unit 150 may include touch and release, drag and drop, long touch, and force touch. The input unit 150 may provide a received input and data related to the received input to the controller 110.

According to embodiments, the display unit 120 and the input unit 150 may be configured as an integrated touch screen.

Figure 2:
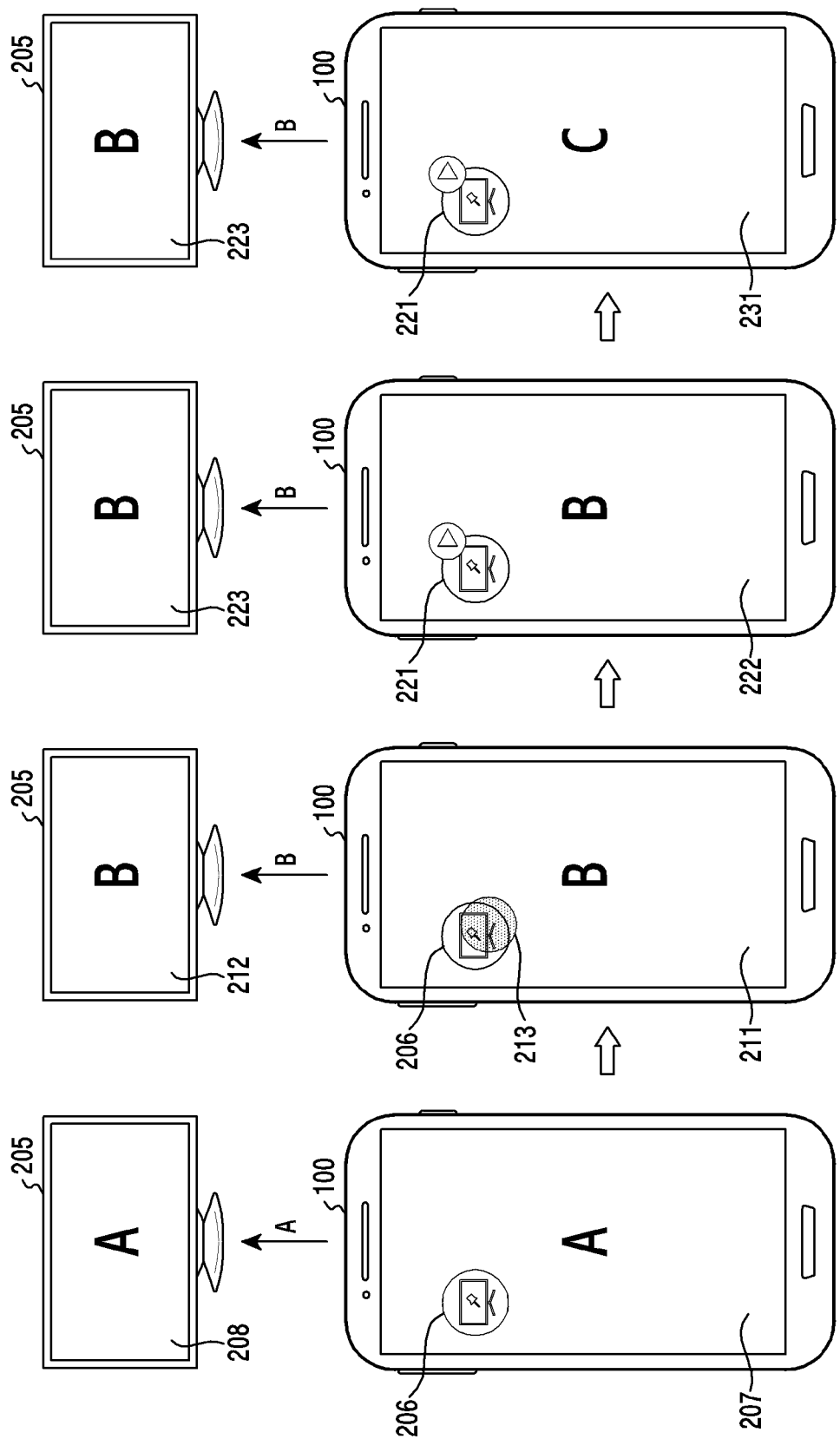
FIG. 2 illustrates an example of screens displayed by an electronic device and an external electronic device according to various embodiments.

FIG. 2 illustrates an example of screens displayed by an electronic device and an external electronic device according to various embodiments.

In FIG. 2, the electronic device 100 may be a device establishing communication for sharing a screen with the external electronic device 205. The connection between the electronic device 100 and an external electronic device 205 may be wired or wireless according to embodiments.

Further, the communication path between the electronic device 100 and the external electronic device 205 may be configured through any of various schemes. In some embodiments, the communication path between the electronic device 100 and the external electronic device 205 may be a direct communication path that does not require a relay node. For example, the electronic device 100 may communicate with the external electronic device 205 through a scheme such as Bluetooth, Bluetooth Low Energy (BLE), Long-Term Evolution (LTE), Device-to-Device (D2D) communication, Wireless Fidelity (Wi-Fi), and direct communication. In some embodiments, the communication path between the electronic device 100 and the external electronic device 205 may be a communication path through which a signal is transmitted or received by a relay node such as a base station or an Access Point (AP). In other words, the electronic device 100 may be connected to the external electronic device 205 through the relay node. For example, the electronic device 100 may communicate with the external electronic device 205 through a cellular communication scheme such as LTE or a Wi-Fi scheme.

The electronic device 100 may establish communication with the external electronic device 205 through an application or a program for mirroring or casting.

Referring to FIG. 2, the electronic device 100 establishing communication for sharing the screen with the external electronic device 205 may display an object 206. The object 206 may be generated in response to establishment of the communication with the external electronic device 205 by the electronic device 100. The electronic device 100 may display the generated object 206 through the display unit 120.

The object 206 may indicate establishment of the communication with the external electronic device 205 by the electronic device 100 for screen sharing. For example, in order to indicate establishment of the communication with the external electronic device 205 by the electronic device 100, the object 206 may include an image of the external electronic device. However, this is not limiting.

The object 206 may provide various functions for supporting screen sharing between the electronic device 100 and the external electronic device 205. The object 206 may be changed to various shapes depending on the screen-sharing state between the electronic device 100 and the external electronic device 205. Various functions provided by the object 206 and various shapes of the object 206 may be described below through the drawings and description thereof.

The electronic device 100 may display a screen 207. For example, the electronic device 100 may display the screen 207 as a wallpaper. In another example, the electronic device 100 may display the screen 207 as an execution screen of a specific application. However, this is not limiting. The screen 207 may include content A. The content A may include an object such as an image, a video, and an icon, or a user interface. However, this is not limiting.

In some embodiments, the object 206 may be floated on the screen 207. Floating of the object 206 on the screen 207 may mean that the object 206 overlaps the screen 207 and the object 206 is located in a higher layer than the screen 207. Further, floating of the object 206 on the screen 207 may mean that the object 206 moves to various locations on the screen 207 according to an input on the object 206. For example, the object 206 may move to a specific location on the screen 207 in response to a user input for moving the object 206, such as a drag input or a slide input.

Hereinafter, in order to share the screen with the external electronic device 205, the object 206 displayed on the electronic device 100 may be referred to as an object for a pin mode. A detailed description of the pin mode will be made below.

The electronic device 100 may transmit data in order to share the screen 207 of the electronic device 100 with the external electronic device 205. For example, data transmitted from the electronic device 100 to the external electronic device 205 may include information for displaying content A with a configuration equal to the configuration of the screen 207 on the external electronic device 205. The external electronic device 205 may receive data from the electronic device 100.

The external electronic device 205 may display a screen 208. The screen 208 may be displayed through the display of the external electronic device 205 on the basis of data received from the electronic device 100. The screen 208 may correspond to the screen 207. In other words, the electronic device 100 may perform screen mirroring on the screen 207.

In some embodiments, the object 206 for the pin mode may not be displayed on the display of the external electronic device 205 in spite of the screen mirroring of the electronic device 100. For example, the object 206 for the pin mode may not be displayed on the display of the external electronic device 205 for user concentration on watching the screen 208 in spite of the screen mirroring of the electronic device 100.

The electronic device 100 may switch from the screen 207 to a screen 211. The electronic device 100 may switch from the screen 207 to the screen 211 on the basis of a user input or a state change of the electronic device 100.

For example, the screen 207 is associated with a first application. The electronic device 100 may change the state of the first application from a foreground state to a background state on the basis of the user input or the state change of the electronic device 100. The foreground state may indicate a state in which the screen is displayed through the display unit 120. The background state may indicate a state in which the application is being executed but display of the screen through the display 120 is stopped (or terminated). The electronic device 100 may display the screen 211 located in a higher layer than the layer of the screen 207 in response to the state change of the first application from the foreground state to the background state. The screen 211 may be a background screen, or may be associated with a second application. The screen 211 may include content B. The content B may include an object such as an image, a video, or an icon, or a user interface. However, this is not limiting.

In some embodiments, the object 206 for the pin mode may be floated on the screen 211. For example, the object 206 may be disposed in a higher layer than the layer of the screen 211. In another example, the object 206 may move to other locations on the screen 211 in response to a user input.

The electronic device 100 may transmit data for displaying the changed display state of the electronic device 100 on the external electronic device 205 to the external electronic device 205. For example, the electronic device 100 may transmit data in order to display content B with a configuration equal to the configuration of the screen 211 on the external electronic device 205. The external electronic device 205 may receive data from the electronic device 100.

The external electronic device 205 may display a screen 212 switched from the screen 208. The external electronic device 205 may display the screen 212 on the basis of the data received from the electronic device 100. The screen 212 may correspond to the screen 211.

In some embodiments, the object 206 for the pin mode may not be displayed on the display of the external electronic device 205.

The electronic device 100 may receive an input 213 on the object 206 for the pin mode. The electronic device 100 may receive the input 213 on the object 206 for the pin mode floated on the screen 211. The input 213 may be an input for entering the pin mode. In some embodiments, the input 213 may be an input for additionally entering the pin mode. The electronic device 100 may configure a plurality of applications as the pin mode in response to reception of the input for additionally entering the pin mode. A detailed definition of the pin mode and the operation for configuring the plurality of applications as the pin mode will be described below.

The attributes of the input 213 may be various. For example, the input 213 may be a touch. In another example, the input 213 may be a long touch. In another example, the input 213 may be a double tap or hovering. In another example, the input 213 may be a force touch having intensity distinguished from the intensity of normal input. However, this is not limiting.

The pin mode may be a mode for displaying only at least some of the various screens, which the electronic device 100 displays, on the external electronic device 205. Further, the pin mode may be a mode for displaying only a screen related to a specific application among a plurality of applications being executed by the electronic device 100 on the external electronic device 205. The pin mode may be a mode for transmitting only some of a plurality of signals related to a display function performed by the electronic device 100 on the external electronic device 205. The pin mode may be a mode in which the electronic device 100 distinguishes or separates the screen displayed through the external electronic device 205 from a screen being displayed by the electronic device 100. The pin mode may be a mode for controlling the display operation of the external electronic device 205. The pin mode may be a mode in which the electronic device 100 maintains a currently displayed screen, a screen state, or attributes of the screen on the external electronic device 205 regardless of a display stage change of the electronic device 100. However, it should be noted that this is conceptually different from pausing. For example, it is assumed that a screen of the electronic device 100 reproducing a video is configured as the pin mode and then the screen displayed by the electronic device 100 switches to an Internet browser. In this case, the external electronic device 205 may display the screen reproducing the video, rather than displaying the Internet browser corresponding to the switched screen. The screen reproducing the video displayed on the external electronic device 205 may remain in a state in progress unless there is a separate user input. In other words, the external electronic device 205 may display the screen reproducing the video independently from switching of the screen of the electronic device 100 to the Internet browser. That is, the user watching the electronic device 100 may use the Internet browser through the display unit 120 of the electronic device 100, and the user watching the external electronic device 205 may watch the video through the display unit of the external electronic device 205.

The electronic device 100 may update the object 206 for the pin mode and display an object 221 for the pin mode in response to reception of the input 213. In other words, the electronic device 100 may update the object 206 for the pin mode to the object 221 for the pin mode by changing the shape of the object 206 for the pin mode in response to reception of the input 213.

The object 221 for the pin mode may further include an element indicating a second application related to the screen 211 rather than the object 206 for the pin mode. The object 221 for the pin mode may further include an element indicating that the second application is pinned, rather than the object 206 for the pin mode. The object 221 for the pin mode may further include an element indicating that the screen 211 related to the second application is fixed on the external electronic device 205, rather than the object 206 for the pin mode. The object 221 for the pin mode may further include an element indicating that only display data related to the second application is transmitted to the external electronic device 205, rather than the object 206 for the pin mode.

The elements may be displayed in various formats according to embodiments. For example, the elements may be included in the object 221 for the pin mode in a badge format indicating the second application (for example, a video reproduction application), as illustrated in FIG. 2.

The electronic device 100 may transmit data for displaying a screen 222 on the external electronic device 205 to the external electronic device 205. For example, the electronic device 100 may transmit data in order to display content B related to the second application with a configuration equal to the configuration of the screen 222 on the external electronic device 205. The external electronic device 205 may receive data from the electronic device 100.

The external electronic device 205 may display a screen 223 on the basis of data received from the electronic device 100. The screen 223 may correspond to the screen 222. In some embodiments, the object 221 for the pin mode may not be included in the screen 223.

The electronic device 100 may switch from the screen 222 to a screen 231. The electronic device 100 may switch from the screen 222 to the screen 231 on the basis of a user input or a state change of the electronic device 100. The electronic device 100 may switch the state of the second application related to the screen 222 from the foreground state to the background state on the basis of the user input or the state change of the electronic device 100. The electronic device 100 may display the screen 231 disposed on a lower layer than the screen 222 in response to switching of the state of the second application. For example, the screen 231 may be a wallpaper. In another example, the screen 231 may be a screen related to the first application or a third application. The screen 231 may include content C. The content C may include an object such as an image, a video, or an icon, and a user interface. However, this is not limiting.

In some embodiments, the object 221 for the pin mode may be floated on the screen 231. For example, the object 221 for the pin mode may be located in a higher layer than the layer of the screen 231. In another example, the object 221 for the pin mode may move to other locations on the screen 231 in response to a user input.

The electronic device 100 may transmit data related to the screen 222 to the external electronic device 205 even though the current screen of the electronic device 100 is switched from the screen 222 to the screen 231. The electronic device 100 may transmit data related to the second application in order to continuously display the screen 223 corresponding to the screen 222 on the external electronic device 205 regardless of switching of the screen of the electronic device 100 from the screen 222 to the screen 231. In other words, the electronic device 100 may transmit data on the second application, configured as the pin mode, to the external electronic device 205. That external electronic device 205 may receive data from the electronic device 100.

The external electronic device 205 may display the screen 223 on the basis of the received data. Although the current screen of the electronic device 100 is switched from the screen 222 to the screen 231, the external electronic device 205 may display the screen 223 corresponding to the screen 222, not corresponding to the screen 231. In other words, when the external electronic device 205 is connected to the electronic device 100 for the pin mode, the external electronic device 205 may display a screen related to the application configured as the pin mode regardless of the screen currently being displayed by the electronic device 100.

FIG. 2 illustrates the operation of the electronic device 100 in an unlocked state, but this is only for a description. In some embodiments, when the electronic device 100 operates in a locked state, the electronic device 100 may perform operations similar to the operations illustrated in FIG. 2. For example, when the electronic device 100 is configured as the pin mode, the electronic device 100 may display the object for the pin mode floated on the locked screen. The electronic device 100 may perform at least one function corresponding to at least one input in response to reception of at least one input for the object for the pin mode floated on the locked screen. At least one function will be described below by way of example.

As described above, the electronic device 100 according to various embodiments may display a screen different from a screen of the external electronic device 205 through the pin mode. In other words, the electronic device 100 may display or control the screen independently from the external electronic device 205 by providing the object for the pin mode.

For example, it is assumed that the user of the electronic device 100 provides a video for children stored in the electronic device 100 to a child through a TV, which is the external electronic device 205. The user of the electronic device 100 may use the object for the pin mode displayed through the display of the electronic device 100 to perform another task such as Internet surfing through the electronic device 100 without interrupting the child watching the video for children through the external electronic device 205. That is, the electronic device 100 according to various embodiments may provide the pin mode or the object for the pin mode so as to provide a greater degree of freedom to the user of the electronic device 100.

In another example, it is assumed that the user of the electronic device 100 provides presentation materials stored in the electronic device 100 to a plurality of audiences through the external electronic device 205. The user of the electronic device 100 may use the pin mode or the object for the pin mode in order to check an email, a Short Message Service (SMS) message, and a message of a messenger received by the electronic device 100 while the external electronic device 205 continues to display the presentation materials in order not to expose private information to the plurality of audience members. That is, the electronic device 100 according to various embodiments may provide the pin mode or the object for the pin mode in order to guarantee the privacy of the user of the electronic device 100.

However, this is not limiting.

As described above, the electronic device according to various embodiments may include a memory configured to store instructions, a display unit, a communication unit, and at least one processor electrically connected to the memory and configured to display an object floated on a first screen being displayed on the electronic device and having a first shape, transmit data for displaying the first screen on an external electronic device to the external electronic device, display the object having a second shape changed from the first shape in response to reception of an input on the displayed object, and execute the stored instructions in order to display a second screen while transmission of the data is maintained in response to switching of the first application related to the first screen from a foreground state to a background state.

According to various embodiments, the at least one processor may be further configured to execute the stored instructions in order to display a plurality of items indicating functions executable through the object in response to reception of another input on the object, and the plurality of items may include at least one of an item indicating a function for switching the first application executed in the background state to the foreground state, an item indicating a function for stopping transmission of the data, an item indicating a function for changing a device connected to the electronic device to another external electronic device, an item for controlling the first application executed in the background state, and an item indicating a function for terminating the connection with the external electronic device. The plurality of items may be included in a message window next to the object in response to reception of the other input.

According to various embodiments, when the first screen is associated with reproduction of content, the object having the second shape may include an element indicating a time point (timing) at which the content is reproduced in the external electronic device.

According to various embodiments, the object having the second shape may include a contour having a color indicating the first application.

According to various embodiments, the object having the second shape may include an image indicating the first application.

According to various embodiments, the object having the first shape may be generated on the basis of establishment of a connection with the external electronic device.

According to various embodiments, the input may be used to enter a pin mode in which only the first screen related to the first application among a plurality of applications being executed within the electronic device is displayed on the external electronic device.

According to various embodiments, the at least one processor may be further configured to execute the stored instructions in order to display a window for displaying the first screen being displayed on the external electronic device in response to reception of another input on the object having the second shape, and the window may overlap the second screen. The at least one processor may be further configured to execute the stored instruction in order to change the size of the window in response to reception of a first input in the window and change a location of the window in response to reception of a second input in the window.

As described above, the electronic device according to various embodiments may include a memory configured to store instructions; a display unit, a communication unit, and at least one processor electrically connected to the memory and configured to execute the stored instructions in order to indicate that a first screen related to a first application executed in a background state is being displayed on an external electronic device connected to the electronic device based on data transmitted from the electronic device and to display an object floated on a second screen being displayed on the electronic device.

Figure 3:
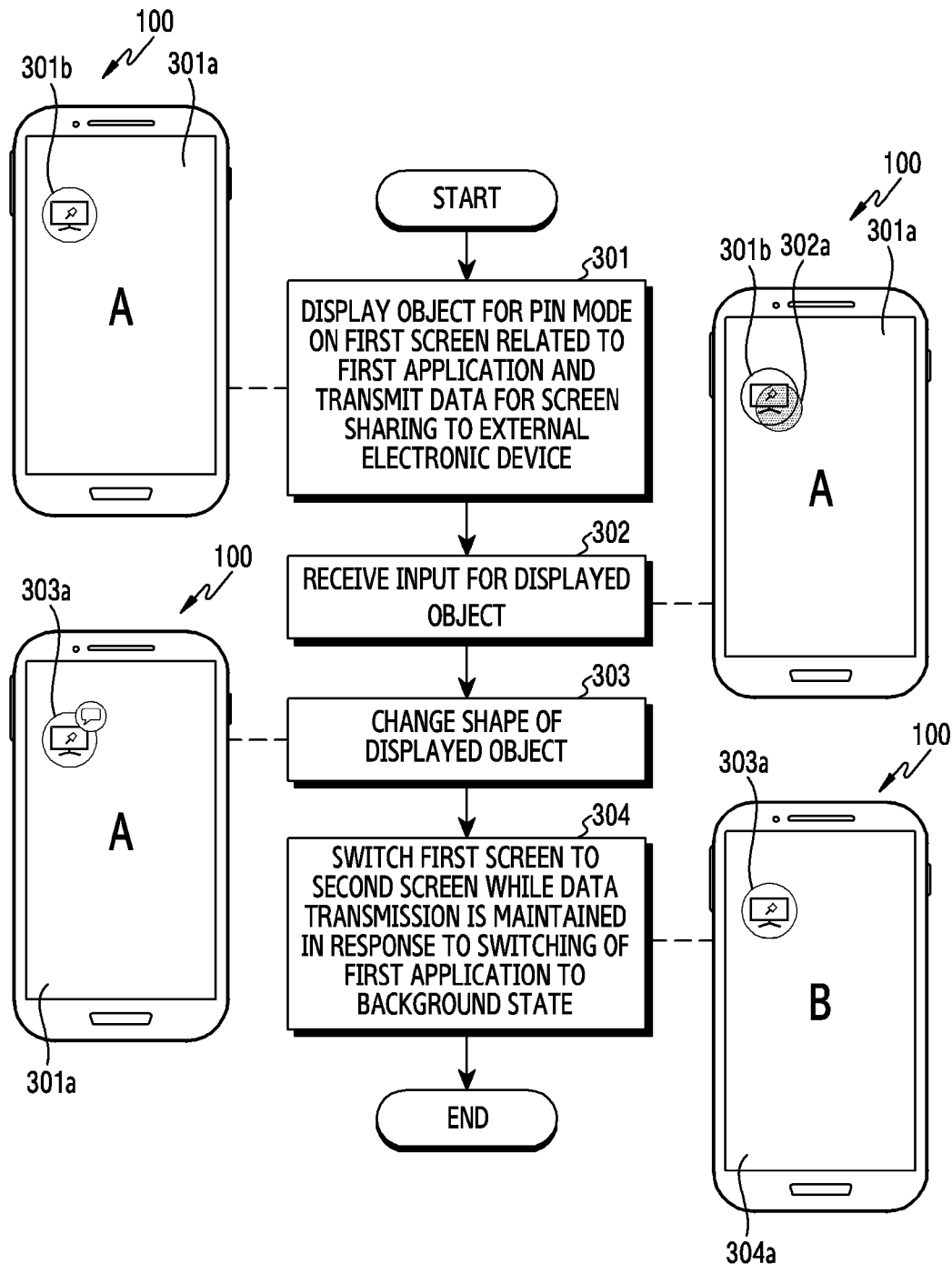
FIG. 3 illustrates an example of the operation of the electronic device according to various embodiments.

FIG. 3 illustrates an example of the operation of the electronic device according to various embodiments. The operation may be performed by the electronic device 100 illustrated in FIG. 1 or at least one of the elements (for example, the controller 110) included in the electronic device 100.

Referring to FIG. 3, in operation 301, the electronic device 100 may display the object for the pin mode on a first screen related to a first application and transmit data for sharing the first screen to the external electronic device 205. In other words, the electronic device 100 may operate in a state of being paired with the external electronic device 205 in order to share the screen. Further, the electronic device 100 may display the object for the pin mode on the first screen in order to determine entry into the pin mode. For example, the object for the pin mode may be floated on the first screen. The electronic device 100 may transmit data for displaying the screen currently being displayed on the electronic device 100 on the external electronic device 205 to the external electronic device 205. In other words, the electronic device 100 may perform screen mirroring on the first screen with the external electronic device 205.

For example, the electronic device 100 may display an object 301b for the pin mode floated on a screen 301a including content A. The screen 301a or the content A may be associated with a first application (for example, a text message application). The initial display location of the object 301b may be variously set. For example, the initial display location of the object 301b may be a fixed location according to user settings or default settings of the electronic device 100. In another example, the initial display location of the object 301b may be adaptively changed according to the display state of the electronic device 100. However, this is not limiting. Although not illustrated in FIG. 3, the external electronic device 205 paired with the electronic device 100 may display a screen having a configuration corresponding to the configuration of the screen 301a being displayed on the electronic device 100.

In operation 302, the electronic device 100 may receive an input on the displayed object. For example, the electronic device 100 may receive a touch input 302a on the object 301b. The electronic device 100 may sense the received touch input 302a. The touch input 302a may be am input for configuring the first application as the pin mode.

In operation 303, the electronic device 100 may change the shape of the displayed object. For example, the electronic device 100 may change the shape of the object 302a from a first shape to a second shape. In other words, the electronic device 100 may update the object 302a so as to generate and display an object 303a. Compared to the first object 302a, the object 303a may further include an element indicating that the object 303a pertains to a text message application, which is the first application. For example, compared to the object 302a, the object 303a may further include an element of a badge format. In the example of FIG. 3, the element of the badge format may have a shape corresponding to the text message application. Further, the element of the badge format may have a color corresponding to the text message application. However, this example is for description only. Various formats of the elements included in the object for the pin mode may be described below in the drawings and the description thereof.

The electronic device 100 may display the object 303a floated on the screen 301a. Although not illustrated in FIG. 3, the external electronic device 205 paired with the electronic device 100 may display a screen having a configuration corresponding to the configuration of the screen 301a being displayed on the electronic device 100.

In operation 304, the electronic device 100 may switch from the first screen to the second screen while data for displaying the first screen on the external electronic device 205 is transmitted in response to switching of the first application to a background state. The electronic device 100 may switch the first application to the background state in response to the received input or the state change of the electronic device 100. In other words, the electronic device 100 may stop displaying the first screen related to the first application. However, since the first application is configured as the pin mode, the electronic device 100 may continuously transmit data for displaying the first screen on the external electronic device 205 to the external electronic device 205 regardless of stopping display of the first screen. The external electronic device 205 may display the first screen related to the first application configured as the pin mode rather than the second screen on the basis of the data received from the electronic device 100.

For example, the electronic device 100 may switch from the screen 301a to a screen 304a. The electronic device 100 may switch from the screen 301a to the screen 304a, which is the wallpaper, on the basis of a user input of pressing a home button of the electronic device 100. The screen 304a may include content B. Although not illustrated in FIG. 3, the external electronic device 205 may display a screen having a configuration corresponding to the configuration of the screen 301a, regardless of the display screen change of the electronic device 100.

Figure 4:
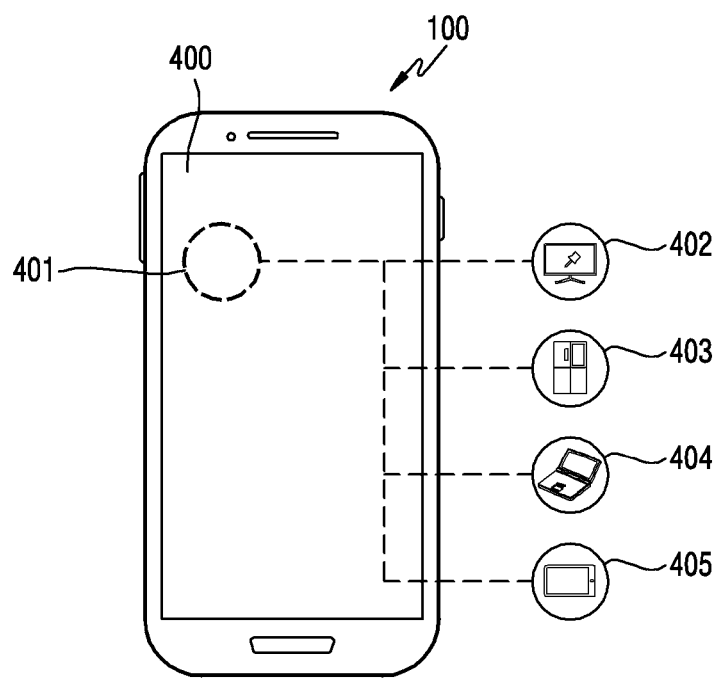
FIG. 4 illustrates an example of the shape of the object for the pin mode according to various embodiments.

FIG. 4 illustrates an example of the shape of the object for the pin mode according to various embodiments. The object having the shape may be displayed on the electronic device 100 illustrated in FIG. 1 or the display unit 120 of the electronic device 100.

Referring to FIG. 4, the electronic device 100 may display an object 401 for the pin mode on a screen 400. In some embodiments, the electronic device 100 may display the object 401 for the pin mode floated on the screen 400.

The object 401 for the pin mode may be displayed in various shapes according to the type of the external electronic device 205 with which the electronic device 100 is paired. The electronic device 100 may adaptively change the shape of the object 401 for the pin mode according to the type of the external electronic device 205 connected to the electronic device 100.

For example, when the external electronic device 205 connected to share the screen with the electronic device 100 is a TV, the object 401 for the pin mode may have a shape which is the same as that of the object 402. That is, the object 401 for the pin mode may include an image indicating a TV, like the object 402.

In another example, when the external electronic device 205 connected to share the screen with the electronic device 100 is a refrigerator, the object 401 for the pin mode may have a shape which is the same as that of the object 403. That is, the object 401 for the pin mode may include an image indicating a refrigerator, like the object 403.

In another example, when the external electronic device 205 connected to share the screen with the electronic device 100 is a notebook (or a laptop computer), the object 401 for the pin mode may have a shape which is the same as that of the object 404. That is, the object 401 for the pin mode may include an image indicating a notebook, like the object 404.

In another example, when the external electronic device 205 connected to share the screen with the electronic device 100 is a tablet Personal Computer (PC), the object 401 for the pin mode may include an image indicating a tablet PC, like the object 405.

However, the shape of the object 401 for the pin mode is not limited thereto. For example, although not illustrated in FIG. 4, the object 401 for the pin mode may be set with a speech bubble including an image or a word indicating the type of the external electronic device 205 connected to the electronic device 100. In this case, the speech bubble including the image or the word indicating the type of the external electronic device 205 may always be displayed, or may be displayed only when a specific condition (for example, hovering input for the object 401) is satisfied.

FIG. 4 may illustrate the shape of the object 401 for the pin mode before a specific application is configured as the pin mode. It should be noted that the object for the pin mode after the specific application is configured as the pin mode also has a shape similar to that in the examples of FIG. 4.

Figure 5:
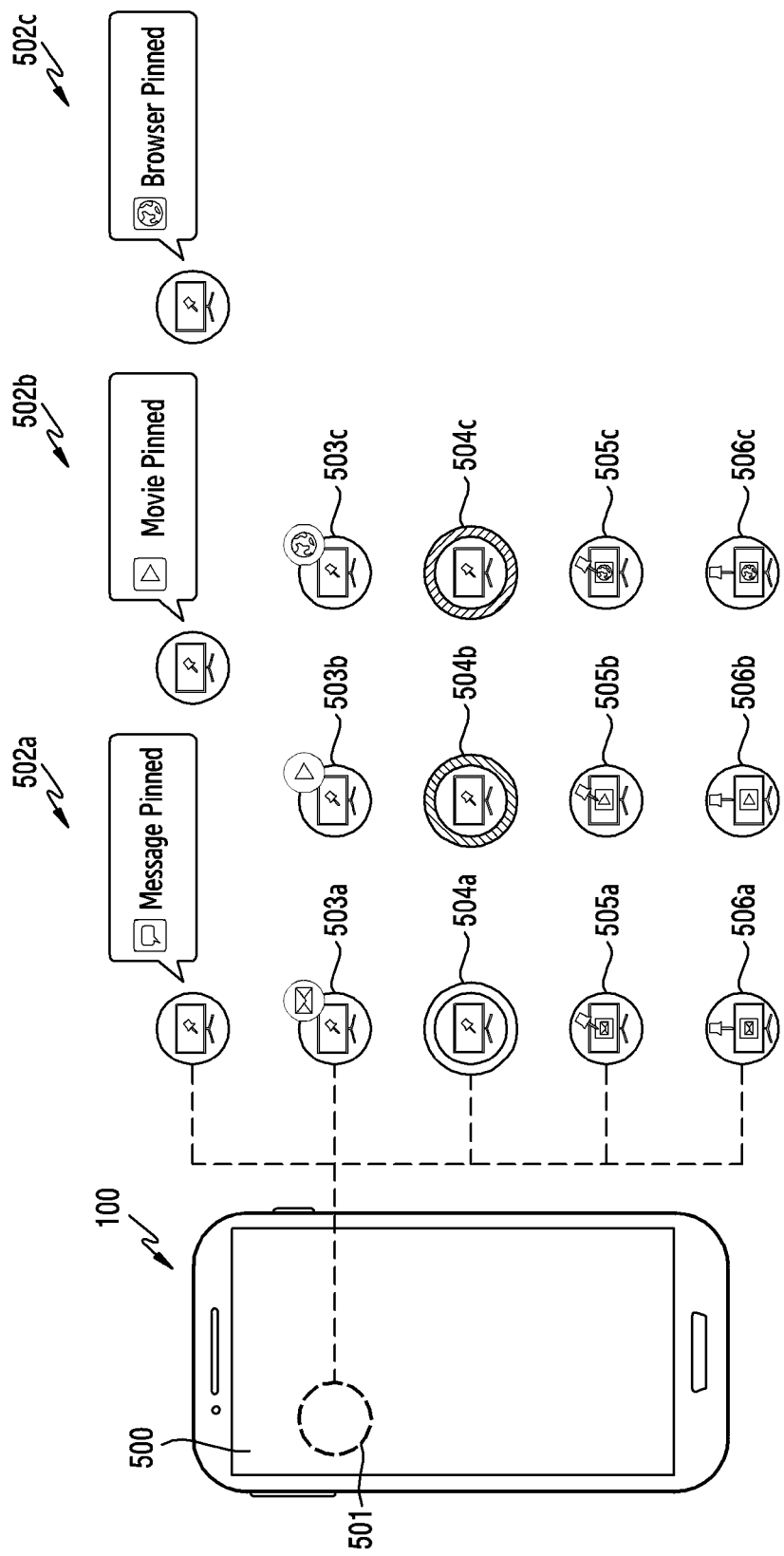
FIG. 5 illustrates another example of the shape of the object for the pin mode according to various embodiments.

FIG. 5 illustrates another example of the shape of the object for the pin mode according to various embodiments. The object having the shape may be displayed on the electronic device 100 illustrated in FIG. 1 or the display unit 120 of the electronic device 100.

Referring to FIG. 5, the electronic device 100 may display an object 501 for the pin mode on a screen 500. The electronic device 100 may operate in a state of being connected with the external electronic device 205 to share the screen with the external electronic device 205. Further, the electronic device 100 may operate in the state in which the target with which the external electronic device 205 shares the screen is configured as a screen related to a first application. In other words, the electronic device 100 may be an electronic device connected to the external electronic device 205 in the state in which the first application is configured as the pin mode. The electronic device 100 may display an object 501 for the pin mode floated on a screen 500.

The object 501 for the pin mode may include an element indicating that the first application is configured as the pin mode.

In some embodiments, the object 501 for the pin mode may include, as an element, a window (for example, a speech bubble) having an image and/or a phrase indicating the first application configured as the pin mode, like objects 502a to 502c. For example, the object 501 for the pin mode may include, as an element, a window including an image and/or a phrase (message pinned) indicating a message application configured as the pin mode like the object 502a. In another example, the object 501 for the pin mode may include, as an element, a window having an image and/or a phrase (movie pinned) indicating a video application configured as the pin mode, like the object 502b. In another example, the object 501 for the pin mode may include, as an element, a window having an image and/or a phrase (browser pinned) indicating an Internet browser configured as the pin mode, like the object 502c.

In other embodiments, the object 501 for the pin mode may indicate the first application configured as the pin mode, like objects 503a to 503c, and may include an image overlapping the object 501 as an element. In other words, the object 501 for the pin mode may include an element having a shape corresponding to an icon of the first application in a badge format, like the objects 503a to 503c. For example, the object 501 for the pin mode may include an element indicating a message application configured as the pin mode in the badge format, like the object 503a. In another example, the object 501 for the pin mode may include an element indicating a video application configured as the pin mode in a badge format, like the object 503b. In another example, the object 501 for the pin mode may include an element indicating an Internet browser configured as the pin mode in a badge format, like the object 503c.

In other embodiments, the object 501 for the pin mode may indicate that the first application is configured as the pin mode using elements having colors, like objects 504a to 504c. In other words, the object 501 for the pin mode may change all or a part of the color of the object 501 according to the type of the application configured as the pin mode. For example, the object 501 for the pin mode may indicate that the message application is configured as the pin mode by including, as an element, a contour having a color (for example, orange) corresponding to the color of the icon of the message application, like the object 504a. In another example, the object 501 for the pin mode may indicate that the video application is configured as the pin mode by including, as an element, a contour having a color (for example, red) corresponding to the color of the icon of the video application, like the object 504b. In another example, the object 501 for the pin mode may indicate that the Internet browser is configured as the pin mode by including, as an element, a contour having a color (for example, blue) corresponding to the color of the icon of the Internet browser, like the object 504c.

In other embodiments, the object 501 for the pin mode may indicate that the first application is configured as the pin mode by displaying reduced-size icons of the first application configured as the pin mode within the object 501 for the pin mode, like objects 505a to 505c. The icon of the first application having the reduced size displayed within the object 501 may overlap a pin image indicating the pin mode. The size of the pin image may be changed according to selection of a design. For example, the object 501 for the pin mode may indicate that the message application is configured as the pin mode by displaying the icon of the message application having the reduced size and the pin image within the object 501, like the object 505a. In another example, the object 501 for the pin mode may indicate that the video application is configured as the pin mode by displaying the icon of the video application having the reduced size and the pin image within the object 501, like the object 505b. In another example, the object 501 for the pin mode may indicate that the Internet browser is configured as the pin mode by displaying the icon of the Internet browser having the reduced size and the pin image within the object 501, like the object 505c.

In other embodiments, the object 501 for the pin mode may indicate that the first application is configured as the pin mode by displaying the reduced icon of the first application configured as the pin mode within the object 501 for the pin mode and the pin image indicating the pin mode around the object 501, like objects 506a to 506c. For example, the object 501 for the pin mode may indicate that the message application is configured as the pin mode by displaying the icon of the message application having the reduced size within the object 501 and displaying the pin image around the object 501, like the object 506a. In another example, the object 501 for the pin mode may indicate that the video application is configured as the pin mode by displaying the icon of the video application having the reduced size within the object 501 for the pin mode and displaying the pin image around the object 501, like the object 506b. In another example, the object 501 for the pin mode may indicate that the Internet browser is configured as the pin mode by displaying the icon of the Internet browser having the reduced size within the object 501 for the pin mode and displaying the pin image around the object 501, like the object 506c.

As described above, FIG. 5 illustrates various methods of indicating the pin mode for the application configured as the pin mode on the object for the pin mode. However, the methods of indicating the pin mode for the application configured as the pin mode on the object for the pin mode are not limited thereto. In other words, various visual effects indicating that the application is configured as the pin mode may be applied to the object for the pin mode.

Figure 6:
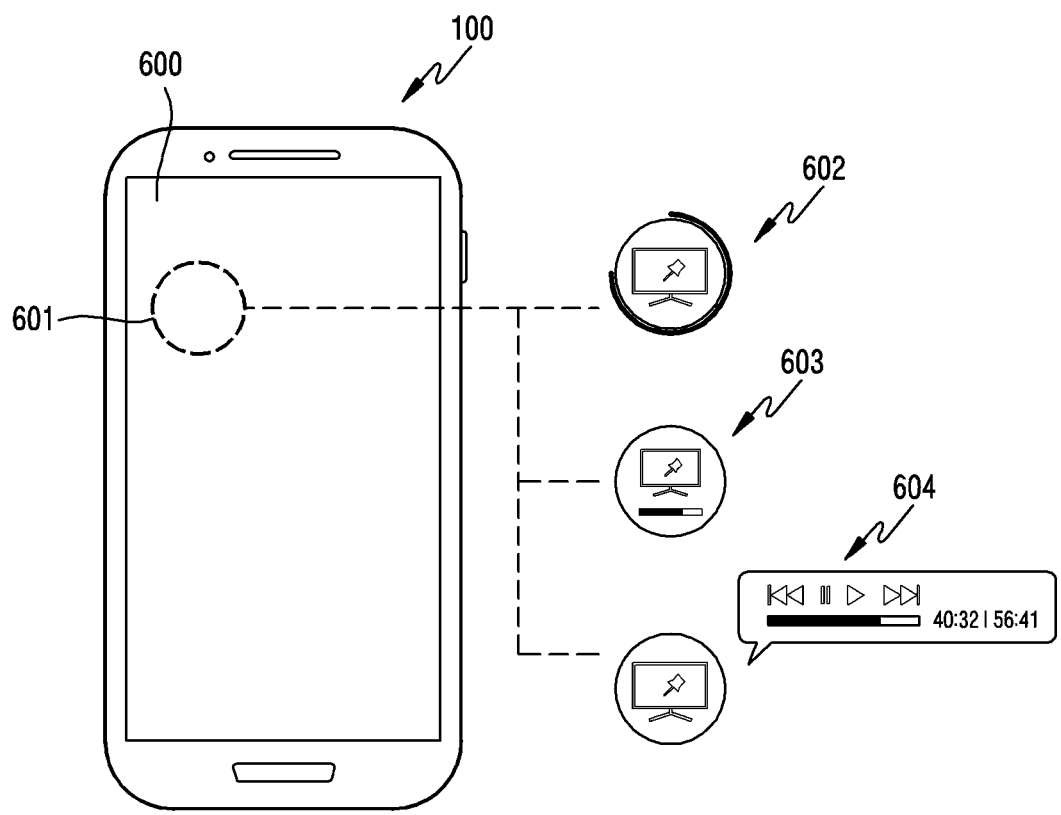
FIG. 6 illustrates another example of the shape of the object for the pin mode according to various embodiments.

FIG. 6 illustrates another example of the shape of the object for the pin mode according to various embodiments. The object having the shape may be displayed on the electronic device 100 illustrated in FIG. 1 or the display unit 120 of the electronic device 100.

Referring to FIG. 6, the electronic device 100 may operate in a state of being connected with the external electronic device 205 in order to share the screen with the external electronic device 205. Further, the electronic device 100 may share a screen related to an application including current progress timing within a predetermined time (for example, a total reproduction time) like a video with the external electronic device 205. For example, the electronic device 100 may operate in the state in which the video application is configured as the pin mode. The electronic device 100 may display an object 601 for the pin mode associated with the video application on a screen 600. In some embodiments, the electronic device 100 may display the object 600 for the pin mode floated on the screen 601.

The object 601 for the pin mode may include an element indicating a current reproduction time of content related to the video application being displayed on the external electronic device 205.

In some embodiments, like the object 602, the object 601 for the pin mode may indicate the current reproduction time (that is, the reproduction progress state) of content being displayed on the external electronic device 205 by including, as an element, a status bar displayed along the contour of the object 601 for the pin mode and having a variable length. In this case, the length of the status bar may be determined on the basis of the ratio (rate) between the total reproduction time of the content being displayed on the external electronic device 205 and the current reproduction time of the content. For example, when half of the content being displayed on the external electronic device 205 has been reproduced, the shape of the status bar displayed along the contour of the object 601 for the pin mode may be a semicircle. In another example, when the reproduction of the content being displayed on the external electronic device 205 is completed, the shape of the status bar displayed along the contour of the object 601 for the pin mode may be a circle. When the reproduction of the content is completed, the object 601 for the pin mode may further display a visual effect indicating that the reproduction of the content in the external electronic device 205 is completed.

In an embodiment, the electronic device 100 may control the reproduction time of the content being displayed on the external electronic device 205 in response to reception of the input on a status bar displayed along a contour of the object 601 for the pin mode. For example, when the electronic device 100 receives an input for dragging the status bar displayed along the contour of the object 601 for the pin mode in a counterclockwise direction, the electronic device 100 may rewind the reproduction time of the content being displayed on the external electronic device 205 by the time corresponding to the length of the drag. In another example, when the electronic device 100 receives an input for dragging the status bar displayed along the contour of the object 601 for the pin mode in a clockwise direction, the electronic device 100 may forward (advance) the reproduction time of the content being displayed on the external electronic device 205 by a time corresponding to the length of the drag.

In other embodiments, the object 601 for the pin mode may indicate the current reproduction time (that is, the reproduction progress state) of the content being displayed on the external electronic device 205 by including, as an element, a status bar having a variable length within the object 601 for the pin mode, like an object 603. In this case, the length of the status bar may be determined on the basis of the ratio between the total reproduction time of the content being displayed on the external electronic device 205 and the current reproduction time of the content. For example, when half of the content being displayed on the external electronic device 205 has been reproduced, the status bar displayed within the object 601 for the pin mode may be marked up by half and displayed. In another example, when the reproduction of the content being displayed on the external electronic device 205 is completed, the entirety of the status bar displayed within the object 601 for the pin mode may be marked up and displayed. The electronic device 100 may control the reproduction time of the content being displayed on the external electronic device 205 in response to reception of the input on the status bar displayed within the object 601 for the pin mode.

In other embodiments, the object 601 for the pin mode may indicate the current reproduction time of content being displayed on the external electronic device 205 by displaying, as an element, a window for displaying and controlling the state of the content being displayed on the external electronic device 205 in the vicinity of the object 601 for the pin mode, like an object 604. In some embodiments, the window may always be displayed. In other embodiments, the window may be displayed according to a specific condition (for example, reception of a hovering input of the object 601 for the pin mode).

The window may include a status bar indicating the reproduction time of the content being displayed on the external electronic device 205. In some embodiments, the window may include at least one button for controlling the state of the content, such as a play/pause button, a rewind button, and a forward button. Although not illustrated in FIG. 6, the window may further include a volume control button and a channel control button (in the case of reproduction of a TV or the radio).

As described above, FIG. 6 illustrates various methods indicating the state of content being displayed on the external electronic device 205 through the object for the pin mode. However, it should be noted that the methods indicating the state of the content being displayed on the external electronic device 205 are not limited thereto. In other words, various visual effects indicating the state of the content being displayed on the external electronic device 205 may be applied to the object for the pin mode.

Figure 7A:
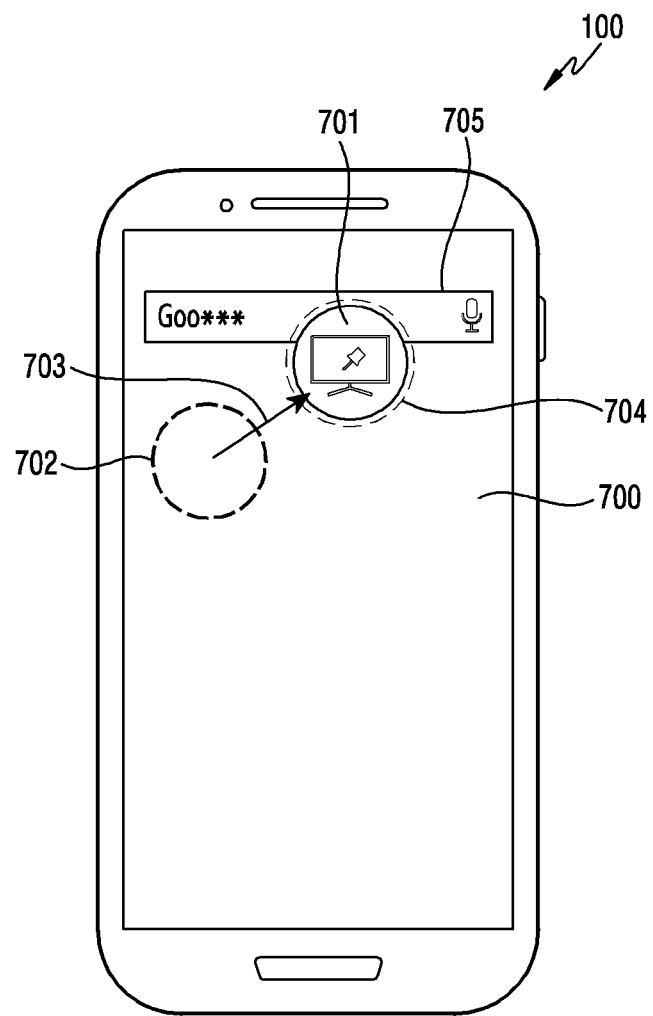
FIG. 7A illustrates an example of movement of the object for the pin mode according to various embodiments.

FIG. 7A illustrates an example of movement of the object for the pin mode according to various embodiments. The movement of the object may be caused by the electronic device 100 illustrated in FIG. 1 or the display unit 120 of the electronic device 100.

Referring to FIG. 7A, the electronic device 100 may display an object 701 for the pin mode on a screen 700. The object 701 for the pin mode may be floated on the screen 700. The object 701 for the pin mode may be positioned in an area 702. In other words, the electronic device 100 may display the object 701 for the pin mode floated on the screen 700 in the area 702. The screen 700 may further include an object 705.

The electronic device 100 may receive an input for moving the object 701 for the pin mode. In other words, the electronic device 100 may receive an input for changing the location of the object 701 for the pin mode to the area 702. In some embodiments, the electronic device 100 may receive a drag-and-release input 703 on the object 701 for the pin mode. The object 701 for the pin mode may be moved from the area 702 to an area 704 in response to the drag-and-release input. The electronic device 100 may change the location of the object 701 for the pin mode in response to the received input in order to provide a more convenient interface to the user.

The object 701 for the pin mode moving on the basis of the received input may be positioned in an empty space within the screen 700, but may at least partially overlap a space in which another object is positioned. For example, the object 701 for the pin mode moving on the basis of the received input may overlap the object 705 in the area 704. In this case, the object 701 for the pin mode may be displayed in a higher layer than the object 705. The electronic device 100 may display the object 701 for the pin mode in a higher layer than the object 705 in order to make the user more easily access the object 701 for the pin mode.

Figure 7B:
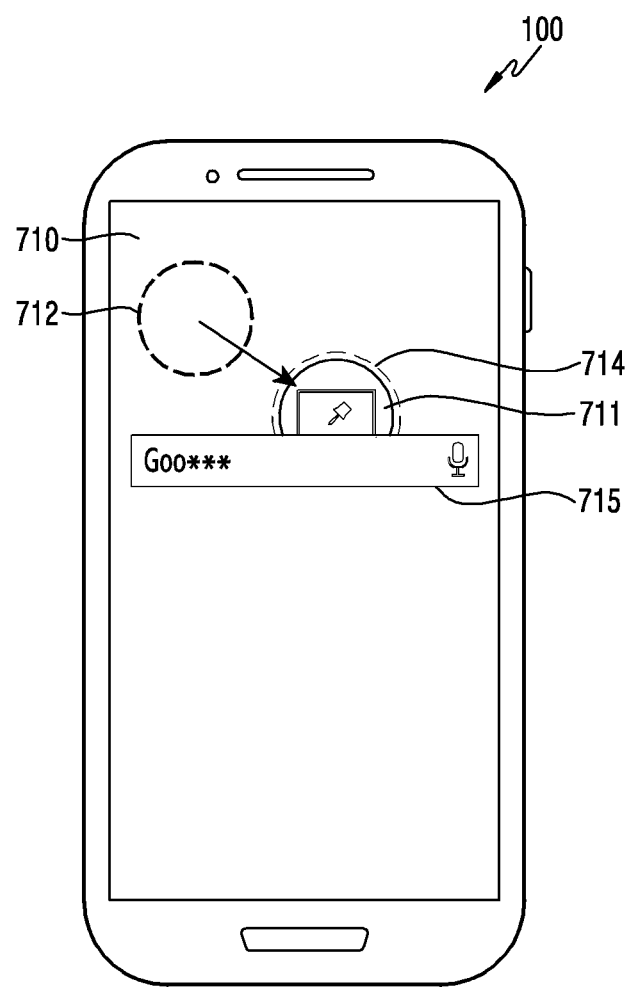
FIG. 7B illustrates another example of movement of the object for the pin mode according to various embodiments.

FIG. 7B illustrates another example of movement of the object for the pin mode according to various embodiments. The movement of the object may be caused by the electronic device 100 illustrated in FIG. 1 or the display unit 120 of the electronic device 100.

Referring to FIG. 7B, the electronic device 100 may display an object 711 for the pin mode on a screen 710. The object 711 for the pin mode may be floated on the screen 710. The object 711 for the pin mode may be positioned at a location 712. In other words, the electronic device 100 may display the object 711 for the pin mode floated on the screen 710 in the area 712. The screen 710 may further include an object 715.

The electronic device 100 may receive an input for moving the object 711 for the pin mode. In other words, the electronic device 100 may receive an input for changing the location of the object 711 for the pin mode to the area 712. In some embodiments, the electronic device 100 may move the object 711 for the pin mode from the area 712 to an area 714 in response to reception of a drag-and-release input 713 for the object 711 for the pin mode.

The object 711 moving on the basis of the received input may overlap the object 715 in the area 714. In this case, the object 711 for the pin mode may be displayed in a lower layer than the object 715, unlike what is shown in FIG. 7A. In other words, the electronic device 100 may adaptively change the positional relationship between the object 711 for the pin mode and the object 715. For example, the electronic device 100 may determine priorities for the arrangement between different objects of various types such as objects 711 to 715 for the pin mode. For example, an object having a high priority may be arranged in a higher layer than an object having a low priority. In some embodiments, the electronic device 100 may determine the priority of the object 711 for the pin mode according to a default setting. For example, the electronic device 100 may configure the priority of the object 711 for the pin mode to be higher than the priorities of other objects. In other embodiments, the electronic device 100 may determine the priorities of the object 711 for the pin mode and other objects in response to a user input. For example, the electronic device 100 may configure the priorities of some of the other objects to be higher than the priority of the object 711 for the pin mode and the priorities of the remaining objects to be lower than the priority of the object 711 for the pin mode.

As illustrated in FIGS. 7A and 7B, the electronic device 100 according to various embodiments may assign higher mobility to the object for the pin mode by floating the object for the pin mode on the screen. Further, the electronic device 100 according to various embodiments may display the object for the pin mode in various ways by controlling the positional relationship between the object for the pin mode and other objects. In other words, the electronic device 100 according to various embodiments may adaptively display the object for the pin mode according to the state of the screen.

Figure 8A:
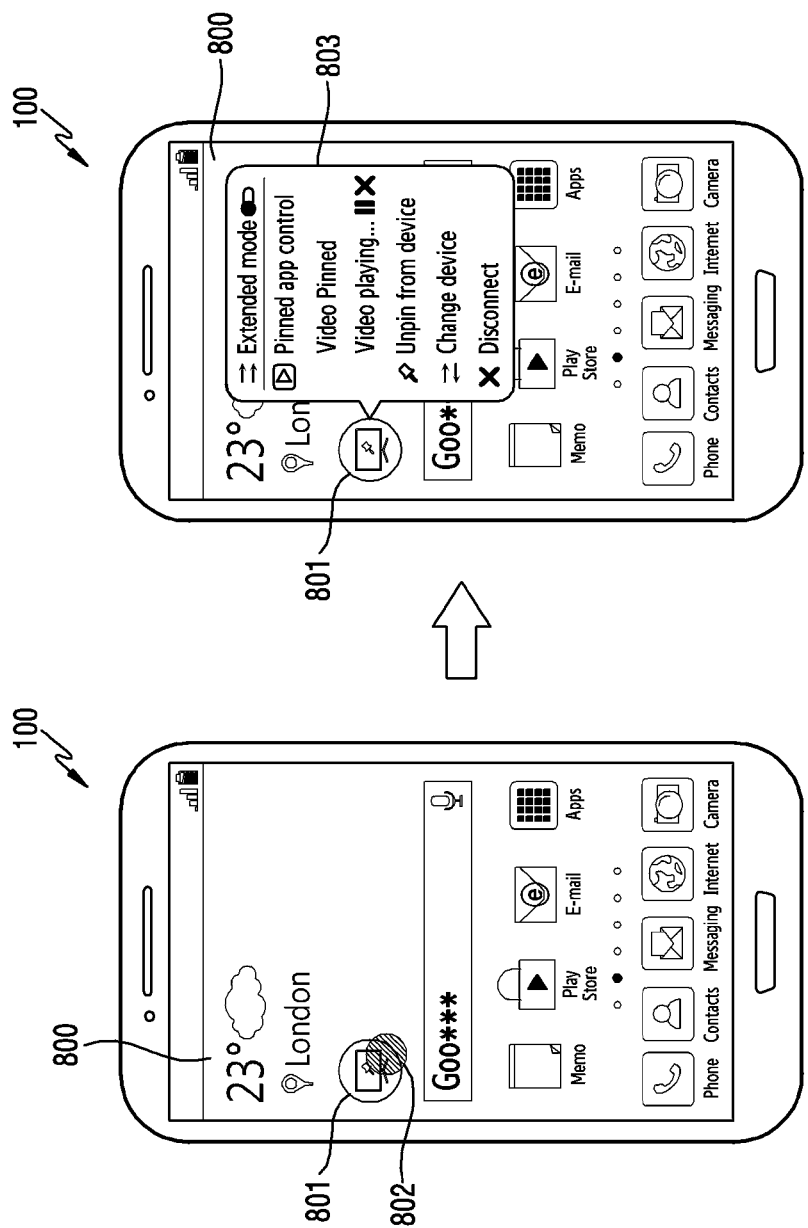
FIG. 8A illustrates an example of a menu of the object for the pin mode according to various embodiments.

FIG. 8A illustrates an example of a menu of the object for the pin mode according to various embodiments. The menu of the object may be displayed on the electronic device 100 illustrated in FIG. 1 or the display unit 120 of the electronic device 100.

Referring to FIG. 8A, the electronic device 100 may display an object 801 for the pin mode on a screen 800. In some embodiments, the screen 800 may be a wallpaper including various objects, such as an indicator indicating the state of the electronic device, a window indicating information (weather information) in the vicinity of the electronic device, at least one object related to an application and displayed on a page within the wallpaper, and at least one other object (that is, Top 5 icons) related to frequently used applications and displayed in a lower area within the wallpaper. The electronic device 100 may display the object 801 for the pin mode floated on the screen 800. In some embodiments, when the electronic device 100 configures a specific application as the pin mode, the object 801 may further include an element indicating the specific application configured as the pin mode.

The electronic device 100 may receive an input 802 on the object 801 for the pin mode. The input 802 received through the object 801 for the pin mode may be an input for displaying a plurality of functions linked to (or associated with) the object 801 for the pin mode. In other words, the electronic device 100 may display a menu window 803 indicating each of the plurality of functions linked to the object 801 in response to reception of the input 802 for the object 801. In some embodiments, the attributes of the input 802 may be different from the attributes of the input for moving the object 801 for the pin mode. In some embodiments, the attributes of the input 802 may be different from the attributes of the input for configuring the specific application as the pin mode through the object 801 for the pin mode.

In some embodiments, the menu window 803 may be configured in a speech bubble format. The menu window 803 may include an item for executing an extended mode function, an item for executing a function for controlling the application configured as the pin mode without switching the application to a foreground (pinned app control), an item for executing a function for releasing the pin mode of the application (unpin from device), an item for executing a function for changing the electronic device linked to the pin mode of the application (that is, changing the first external electronic device 205 to another electronic device) (change device), and/or an item for executing a function for terminating the connection with the external electronic device 205 for screen sharing (disconnect). According to some embodiments, the menu window 803 may include more items. A detailed description of each of the plurality of icons included in the menu will be made below.

The electronic device 100 may execute a function corresponding to a specific item in response to reception of the input on the specific item among the plurality of items included in the menu window 803.

In some embodiments, the menu window 803 may be positioned around the object 801. In other embodiments, the menu window 803 may be positioned to overlap the object 801. In other embodiments, the menu window 803 may be positioned in an area corresponding to the location of an input means detected by a sensor of the electronic device 100.

In some embodiments, the menu window 803 may be opaquely displayed. In other embodiments, the menu window 803 may be translucently displayed to allow the user to recognize content on the screen positioned beneath the menu window 803.

Figure 8B:
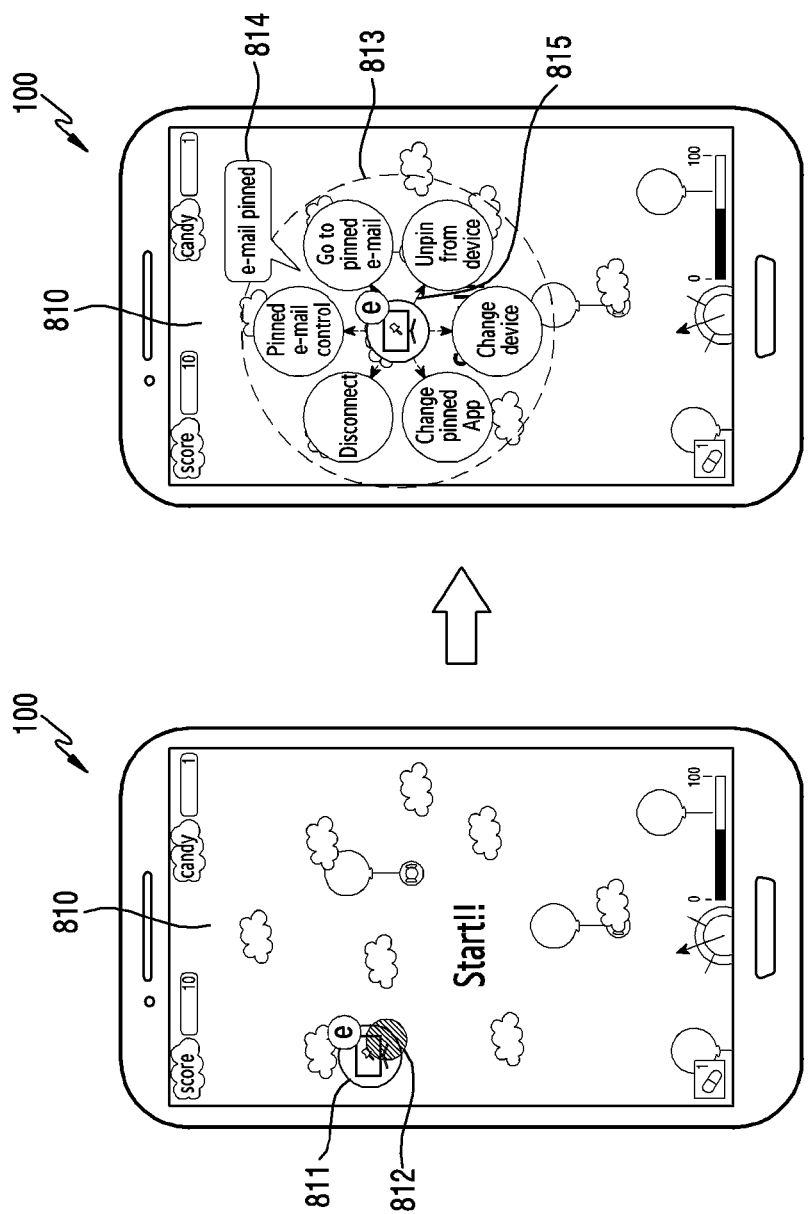
FIG. 8B illustrates another example of the menu of the object for the pin mode according to various embodiments.

FIG. 8B illustrates another example of the menu of the object for the pin mode according to various embodiments. The menu of the object may be displayed on the electronic device 100 illustrated in FIG. 1 or the display unit 120 of the electronic device 100.

Referring to FIG. 8B, the electronic device 100 may display an object 811 for the pin mode on a screen 810. The screen 810 may be associated with a game. In other words, the screen 810 may be a game execution screen. The object 811 for the pin mode may include an element indicating that an email application is configured as the pin mode. For example, the object 811 for the pin mode may include an image having a shape corresponding to the shape of an icon of the email application in a badge format. That is, the electronic device 100 may display the game execution screen on the display unit 120 while transmitting a screen related to the email application to the external electronic device 205. In other words, the electronic device 100 may display the screen related to the email application through the display unit of the external electronic device 205 and display the game execution screen through the display unit 120.

The electronic device 100 may receive an input 812 on the object 811. The input 812 may be an input for displaying a menu for performing the plurality of functions linked to the object 811. The attributes of the object 812 may be different from the attributes of another input on the object 811 (for example, input for moving the object 811 or input for configuring a specific application as the pin mode). For example, the input for moving the object 811 may be a touch and drag, but the input 812 may be a touch and hold.

The electronic device 100 may display a menu 813 in response to reception of the input 812. The menu 813 may track an input means causing the input 812 on the basis of a hold command included in the input 812. In other words, the menu 813 may be accompanied by the input means.

In some embodiments, the menu 813 may display a window 814 indicating the application configured as the pin mode. The window 814 may include a phrase indicating that data for displaying the screen related to the email application on the external electronic device 205 is being transmitted (or a phrase indicating that the screen related to the email application is being displayed on the external electronic device 205), as illustrated in FIG. 8B. For example, the window 814 may include the phrase "e-mail pinned". In another example, the window 814 may include the phrase "application pinned", which does not specify the application configured as the pin mode. In this case, the object 811 may further include an image of a badge format in order to indicate the application configured as the pin mode.

In some embodiments, the menu 813 may display a plurality of images indicating a plurality of destinations for the object 811. The plurality of images may indicate a plurality of functions linked to the object 811. For example, the plurality of images may include one or more of an image indicating a function for executing a shortcut command for the email application configured as the pin mode (go to pinned email), an image indicating a function for releasing the pin mode of the email application (unpin from device), an image indicating a function for changing the electronic device related to the pin mode (change device), an image indicating a function for changing the application configured as the pin mode (change pinned app), or an image indicating a function for releasing the communication connection for sharing the screen with another electronic device (disconnect).

The electronic device 100 may execute a function indicated by the one image in response to reception of the input 815 for overlapping the object 811 with a specific image among the plurality of images included in the menu 813 (or input for moving the object 811 to the specific image). For example, the electronic device 100 may deactivate a communication path for sharing the screen with the external electronic device 205 in response to reception of the input 815 for moving the object 811 to the specific image (disconnect). In another example, the electronic device 100 may display a game execution screen through the display unit 120 of the electronic device 100 in response to reception of the input 815 for overlapping the object 811 with another specific image (go to pinned email).

Figure 8C:
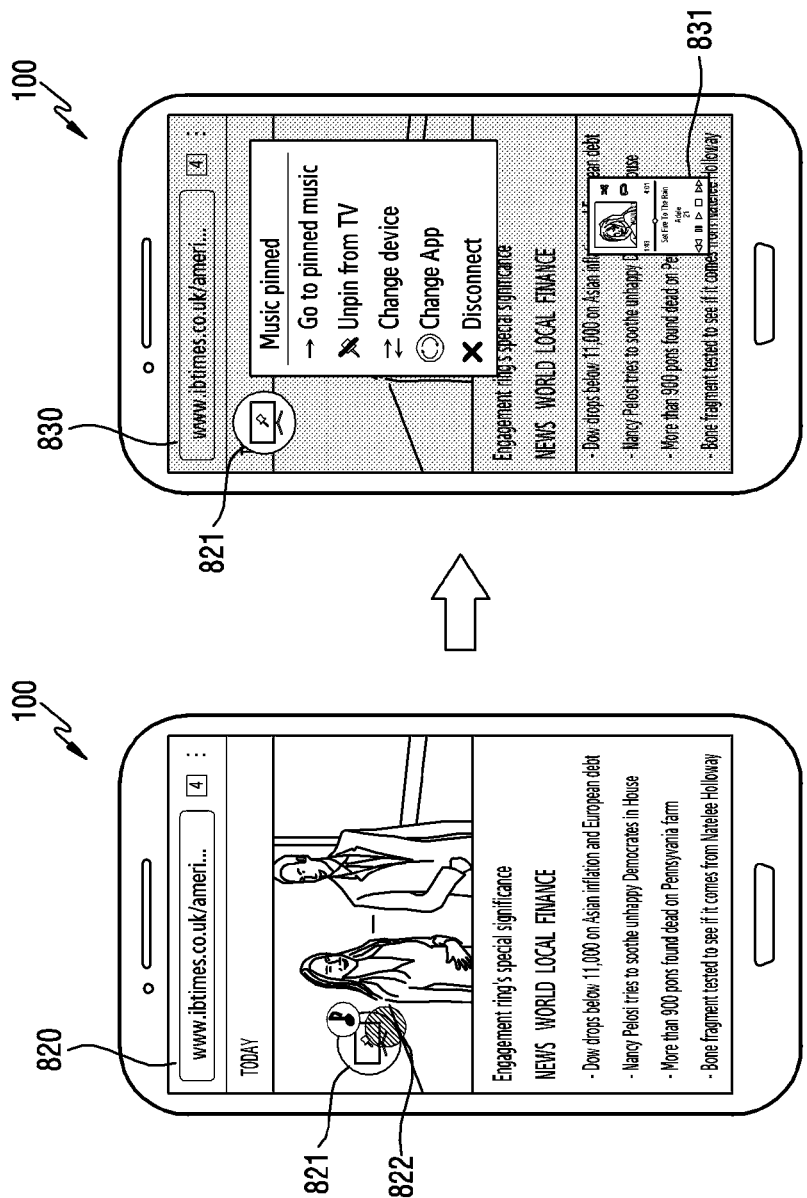
FIG. 8C illustrates another example of the menu of the object for the pin mode according to various embodiments.

FIG. 8C illustrates another example of the menu of the object for the pin mode according to various embodiments. The menu of the object may be displayed on the electronic device 100 illustrated in FIG. 1 or the display unit 120 of the electronic device 100.

Referring to FIG. 8C, the electronic device 100 may display an object 821 for the pin mode on a screen 820. The screen 820 may be associated with Internet surfing. In other words, the screen 820 may be a webpage displaying a screen of an Internet browser. The object 821 for the pin mode may include an element indicating that a music application is configured as the pin mode. For example, the object 821 for the pin mode may include an element having a shape corresponding to the shape of an icon of the music application in a badge format. That is, the electronic device 100 may display a screen related to the music application through the external electronic device 205, and may display a screen 820, corresponding to the screen displaying the webpage, through the display unit 120.

The electronic device 100 may receive an input 821 on the object 822. The input 822 may be an input for activating the menu for performing a plurality of functions linked to the object 821. The attributes of the input 822 may be distinguished from the attributes of another input on the object 821.

The electronic device 100 may display a menu screen 830 in the entire area of the display unit 120 of the electronic device 100 in response to reception of the input 822. The menu screen 830 may include more detailed information than the menu illustrated in FIGS. 8A and 8B.

In some embodiments, the menu screen 830 may include items for executing various functions linked to the object 821. For example, the menu screen 830 may include at least one of an indicator item indicating that the music application is configured as the pin mode, an instruction item for directly activating the music application (that is, a shortcut item (go to pinned music)), an instruction item for terminating the pin mode of the music application (unpin from TV), an instruction item for changing the device linked to the pin mode (change device), an instruction item for changing the application configured as the pin mode to another application (change App.), or an instruction item for terminating the connection with the external electronic device 205 for screen sharing (disconnect).

In some embodiments, the menu screen 830 may include a thumbnail 831 for a preview. For example, the menu screen 830 may include the thumbnail 831 for displaying a screen corresponding to the screen currently being displayed on the external electronic device 205. In other words, the electronic device 100 may identify the display state of the external electronic device 205 through the thumbnail 831 of the menu screen 830 triggered by the object 821 without switching to a screen related to the music application.

In some embodiments, the menu screen 830 may be opaquely displayed. In other embodiments, the menu screen 830 may be translucently displayed to make the user recognize the state of the screen positioned beneath the menu screen 830.

As described above, FIGS. 8A to 8C illustrate various menus triggered by the object for the pin mode. At least one of the menus illustrated in FIGS. 8A to 8C may be simultaneously applied to the electronic device 100 according to the state of the electronic device 100 according to various embodiments. For example, the electronic device 100 may display a menu window 803 in response to reception of a first input and display a menu 813 in response to reception of a second input different from the first input. However, the menu caused by the object for the pin mode is not limited to what is shown in FIGS. 8A to 8C.

Figure 9:
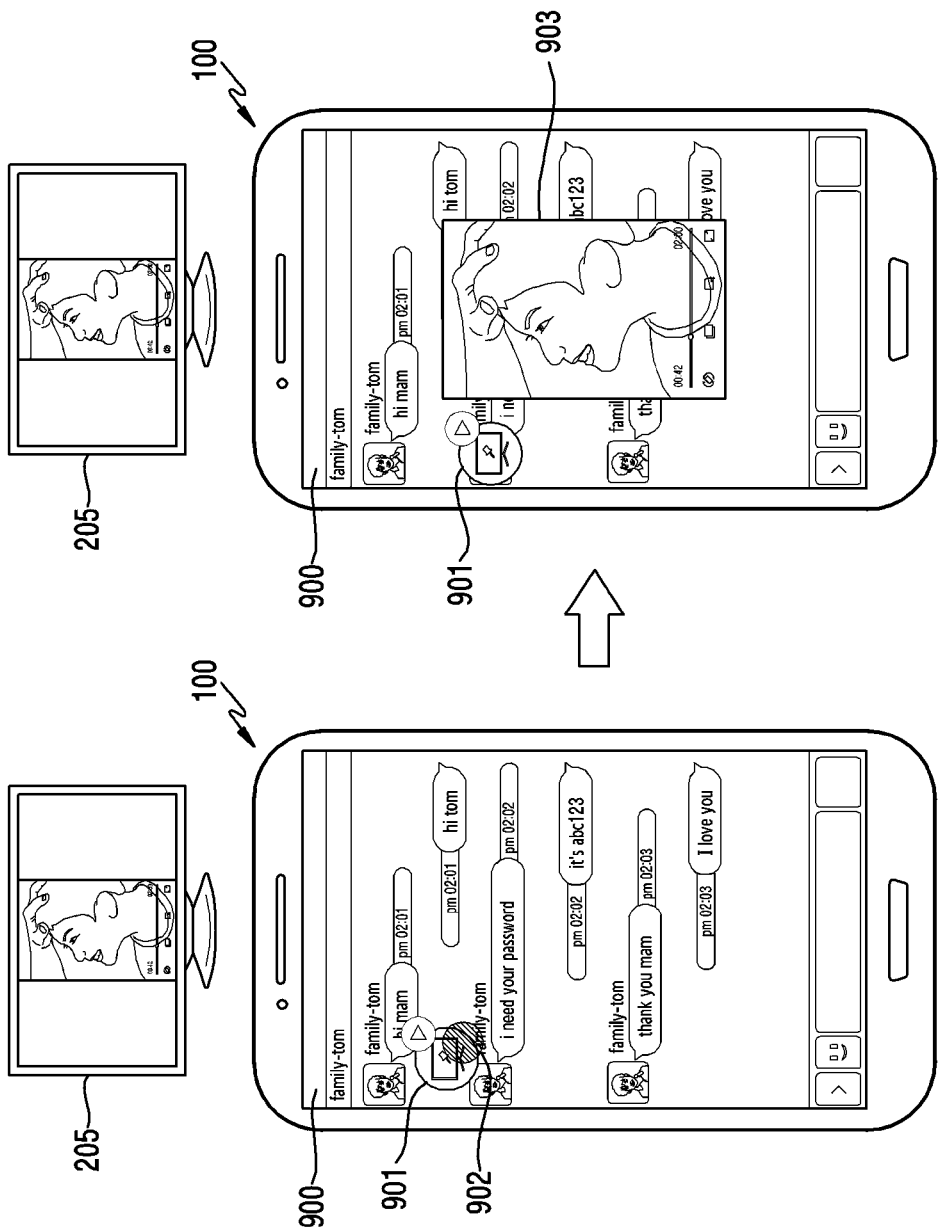
FIG. 9 illustrates an example of a preview window of the object for the pin mode according to various embodiments.

FIG. 9 illustrates an example of a preview window of the object for the pin mode according to various embodiments. The preview window may be displayed on the electronic device 100 illustrated in FIG. 1 or the display unit 120 of the electronic device 100.

Referring to FIG. 9, the electronic device 100 may display an object 901 for the pin mode on a screen 900. The screen 900 may be associated with a text message application. In other words, the screen 900 may include a user interface for the text message application. The external electronic device 205, connected to the electronic device 100 through the pin mode, may display a screen related to a video application. In other words, the external electronic device 205 may display a screen of content reproduced through the video application. Since the electronic device 100 has configured the video application as the pin mode, the external electronic device 205 may display the screen of content reproduced through the video application on the basis of data received from the electronic device 100 even though the electronic device 100 displays the screen 900 related to the text message application.

In some embodiments, the electronic device 100 may float the object 901 on the screen 900. The floated object 901 may move in response to a user input or a state change of the electronic device.

The electronic device 100 may receive an input 902 on the object 901. The input 902 may be an input for activating a preview function for the screen being displayed on the external electronic device 205. The input 902 may be independent from other input. In other words, the attributes of the input 902 may be distinguished from the attributes of other input. For example, the input for activating a menu for the object 901 may be a double-tap input on the object 901, and the input for activating a preview function may be a hovering input over the object 901.

The electronic device 100 may display a window 903 for providing the preview function in response to reception of sensing of the input 902. The window 903 may display a screen corresponding to the screen being displayed on the external electronic device 205. In some embodiments, the window 903 may further include menus for remotely controlling the screen being displayed on the external electronic device 205 (for example, play, rewind, forward, volume control, stop, and channel change when the screen being displayed on the external electronic device 205 is associated with a TV). In this case, the electronic device 100 may perform a function corresponding to at least one list in response to reception of an input for at least one list among the lists.

In some embodiments, the window 903 may be displayed to overlap the screen 900 currently being displayed on the electronic device 100. The initial display location of the window 903 may be changed by a user setting, or may be fixed by a default setting of the electronic device 100 or an option. The window 903 may be moved by a user input (drag and drop) for moving the window 903. In other embodiments, the window 903 may be displayed in a full-screen mode.

In some embodiments, the window 903 may have various sizes. For example, the window 903 may be displayed in a size determined on the basis of the user setting or the default setting of the electronic device 100. The size of the window 903 may be adaptively changed in response to sensing of the user input for controlling the size of the window 903 (for example, input on a menu item for restoration to a previous size, a minimize menu, or a maximize menu).

As described above, the electronic device 100 according to various embodiments does not require a separate input for calling (or inquiring) an application related to the screen operating in the state of having been switched to the background and being displayed on the external electronic device 205 by providing a preview window generated through the input on the object for the pin mode. In other words, the electronic device 100 according to various embodiments may provide a preview window to make the user more easily identify the display state of the external electronic device 205.

Figure 10:
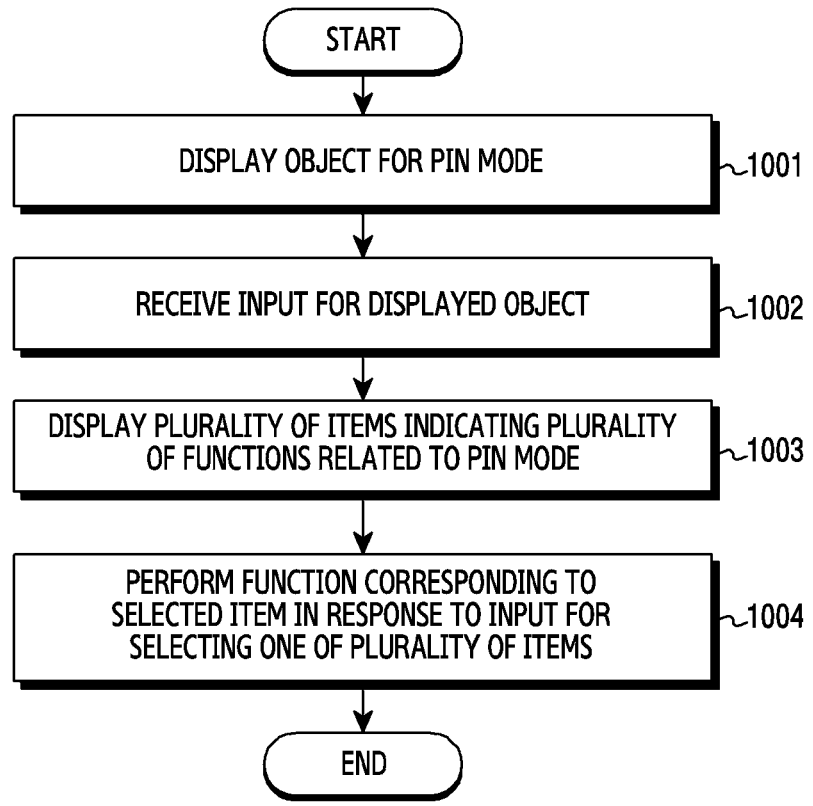
FIG. 10 illustrates an example of the operation of the electronic device for performing various functions through the object for the pin mode according to various embodiments.

FIG. 10 illustrates an example of the operation of the electronic device for performing various functions through the object for the pin mode according to various embodiments. The operation may be performed by the electronic device 100 illustrated in FIG. 1 or at least one of the elements within the electronic device 100 (for example, the controller 110).

Referring to FIG. 10, in operation 1001, the electronic device 100 may display the object for the pin mode. For example, the electronic device 100 may display the object for the pin mode floated on the wallpaper. In another example, the electronic device 100 may display the object for the pin mode floated on the screen related to a specific application. The application related to the object for the pin mode (that is, the application configured as the pin mode) may not be associated with the screen currently being displayed on the electronic device 100. For example, the screen being displayed on the electronic device 100 may be a screen related to a video application, but the application configured as the pin mode may be an email application.

In operation 1002, the electronic device 100 may receive an input on the displayed object. The received input may be an input for displaying a menu for displaying functions linked to the object for the pin mode. The electronic device 100 may sense the received input.

In operation 1003, the electronic device 100 may display a plurality of items indicating a plurality of functions related to the pin mode in response to sensing of the received input. For example, the electronic device 100 may display one of the menus illustrated in FIGS. 8A to 8C.

In operation 1004, the electronic device 100 may perform a function corresponding to a selected item in response to the input of selecting one of the plurality of displayed items. For example, the electronic device 100 may perform at least one operation for a function of changing the device linked to the pin mode from the external electronic device 205 to another external electronic device in response to reception of the input on a first item among the plurality of items. In another example, the electronic device 100 may disconnect the communication connection with the external electronic device 205, which is connected to the electronic device 100 to share the screen, in response to reception of the input on a second item among the plurality of items.

Figure 11:
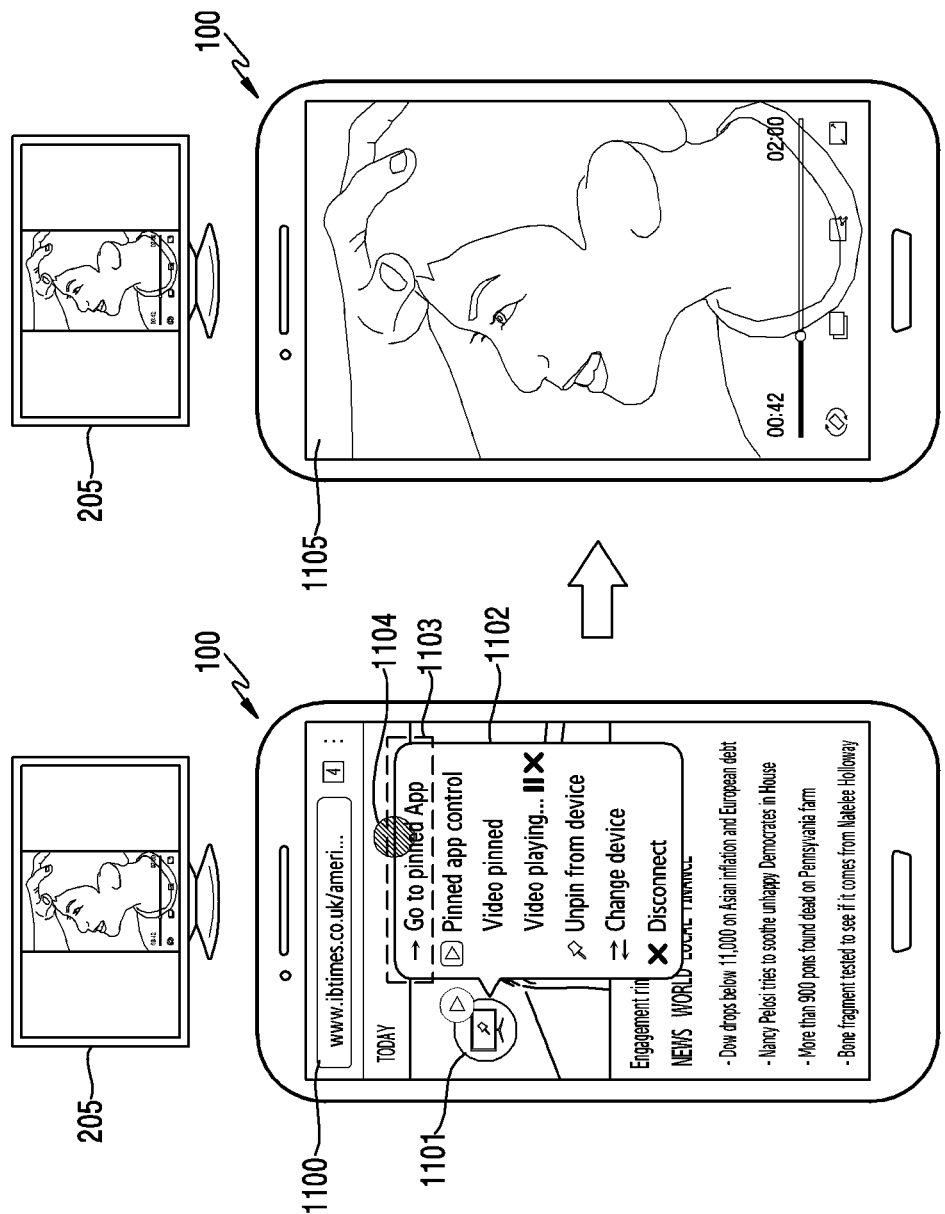
FIG. 11 illustrates an example of a function linked to the object for the pin mode according to various embodiments.

FIG. 11 illustrates an example of a function linked to the object for the pin mode according to various embodiments. The function may be performed by the electronic device 100 illustrated in FIG. 1.

Referring to FIG. 11, the electronic device 100 may display an object 1101 for the pin mode on a screen 1100. The electronic device 100 may be connected to the external electronic device 205 through the pin mode. The electronic device 100 may operate in the state in which a video application is configured as the pin mode. In other words, the electronic device 100 may display a screen 1100 different from the screen related to the video application while transmitting data related to the video application configured as the pin mode to the external electronic device 205. The electronic device 100 may display the object 1101 floated on the screen 1100. The electronic device 100 may display a menu window 1102 related to the floated object 1101. Meanwhile, the external electronic device 205 may display the screen related to the video application configured as the pin mode on the basis of data received from the electronic device 100.

The electronic device 100 may display the menu window 1102 in response to sensing of the input on the object 1101.

The menu window 1102 may include an item 1103 for activating a function for creating a shortcut to the application configured as the pin mode (pinned application), an item for controlling the application configured as the pin mode without loading the screen of the application configured as the pin mode, an item for activating a function for releasing the pin mode of the application, an item for activating a function for changing the device linked through the pin mode, and an item for activating a function for disconnecting the device connected for sharing the screen. In some embodiments, the menu window 1102 may further include an item for activating another function.

The electronic device 100 may receive an input 1104 on the item 1103 included in the displayed menu window 1102. The input 1104 may be an input for executing a function corresponding to the item 1103.

The electronic device 100 may directly creating a shortcut to the video application configured as the pin mode, which is the function corresponding to the item 1103, in response to sensing of the input 1104. In other words, the electronic device 100 may display a screen 1105 related to the video application in response to sensing of the input 1104. Since the electronic device 100 is transmitting data related to the video application to the external electronic device 205 through the pin mode, the screen 1105 may correspond to a screen being displayed on the external electronic device 205.

As described above, the electronic device 100 according to various embodiments may load the screen being displayed through the external electronic device 205 using the item 1103. In other words, when the screen being displayed on the electronic device 100 is not the same as the screen being displayed on the external electronic device 205 linked to the electronic device 100, the electronic device 100 according to various embodiments may rapidly check and display the screen being displayed on the external electronic device 205 through the item 1103.

Figure 12:
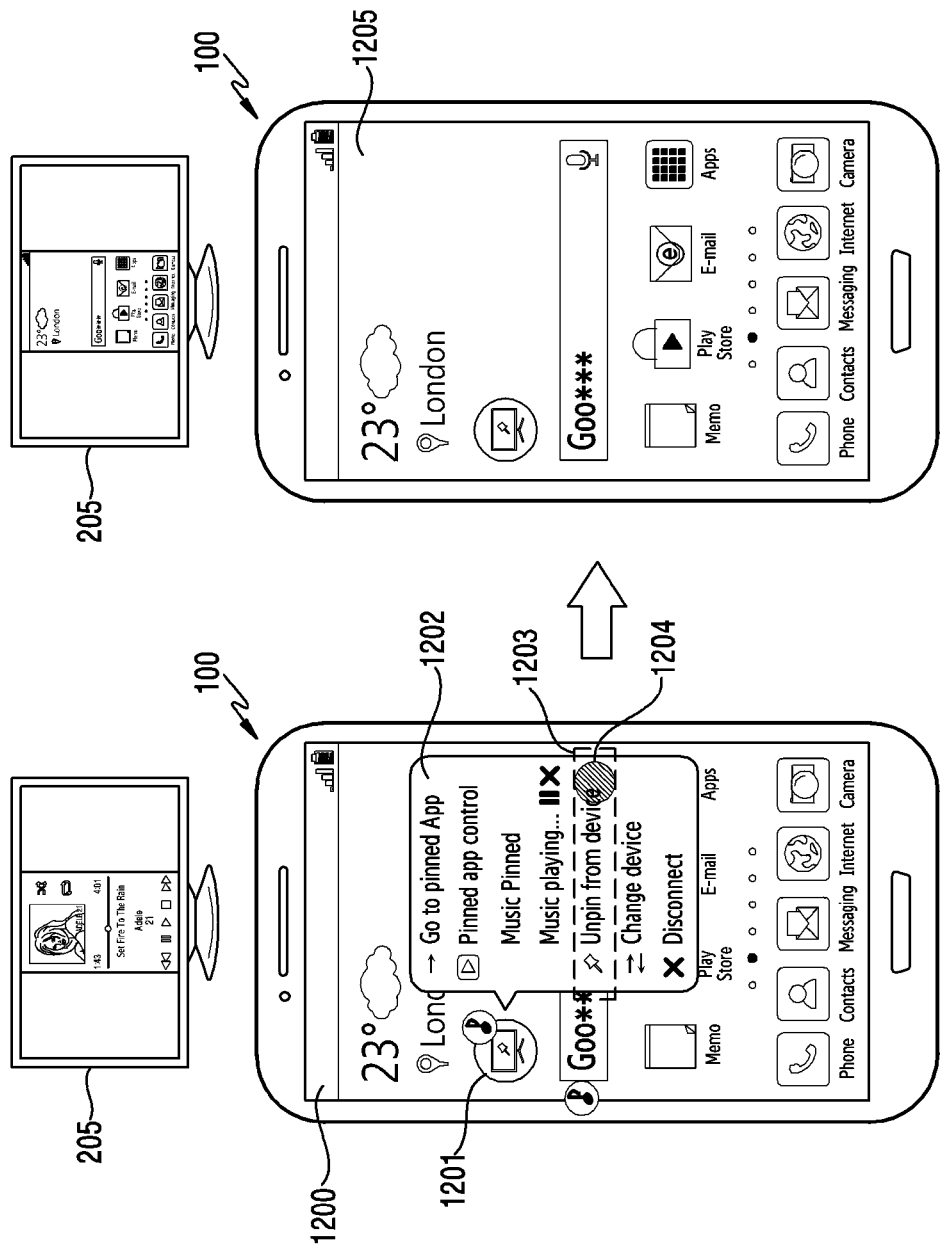
FIG. 12 illustrates another example of the function linked to the object for the pin mode according to various embodiments.

FIG. 12 illustrates another example of the function linked to the object for the pin mode according to various embodiments. The function may be performed by the electronic device 100 illustrated in FIG. 1.

Referring to FIG. 12, the electronic device 100 may display an object 1201 for the pin mode on a screen 1200. The electronic device 100 may be connected with the external electronic device 205 through the pin mode. The electronic device 100 may operate in the state in which a music application is configured as the pin mode. In other words, the electronic device 100 may display the screen 1200 through the display unit 120 while displaying a screen related to the music application configured as the pin mode through the external electronic device 205. The object 1201 may include an element indicating that the music application is configured as the pin mode.

The electronic device 100 may display a menu window 1202 in response to sensing of the input on the object 1201.

The menu window 1202 may include an item for entering an extended mode, an item for activating a function for creating a shortcut to the application configured as the pin mode, an item for controlling the application without displaying the application configured as the pin mode, an item 1203 for activating a function for terminating the pin mode of the application, an item for activating a function for changing the device linked through the pin mode, and an item for activating a function for terminating the connection with the device with which the screen is shared.

The electronic device 100 may receive an input 1204 on the item 1203 displayed in the menu item 1202. For example, the input 1204 may be a touch input.

The electronic device 100 may terminate the pin mode of the music application in response to reception of the input 1204. The electronic device 100 may stop transmitting data related to the music application to the external electronic device 205 in response to reception of the input 1204. The electronic device 100 may transmit data on the screen currently being displayed on the electronic device 100 to the external electronic device 205 in response to reception of the input 1204. For example, the electronic device 100 may transmit data on the screen 1205 to the external electronic device 205. The external electronic device 205 may receive the data on the screen 1205 from the electronic device 100. The external electronic device 1205 may display a screen having a configuration corresponding to the configuration of the screen 1205 on the basis of the received data.

As described above, the electronic device 100 according to various embodiments may determine whether to distinguish the screen being displayed on the electronic device 100 from the screen being displayed on the external electronic device 204 through item 1203. In other words, the electronic device 100 according to various embodiments may assign higher accessibility to the user by determining whether to perform mirroring of the screen through a procedure simplified by the item 1203.

Figure 13:
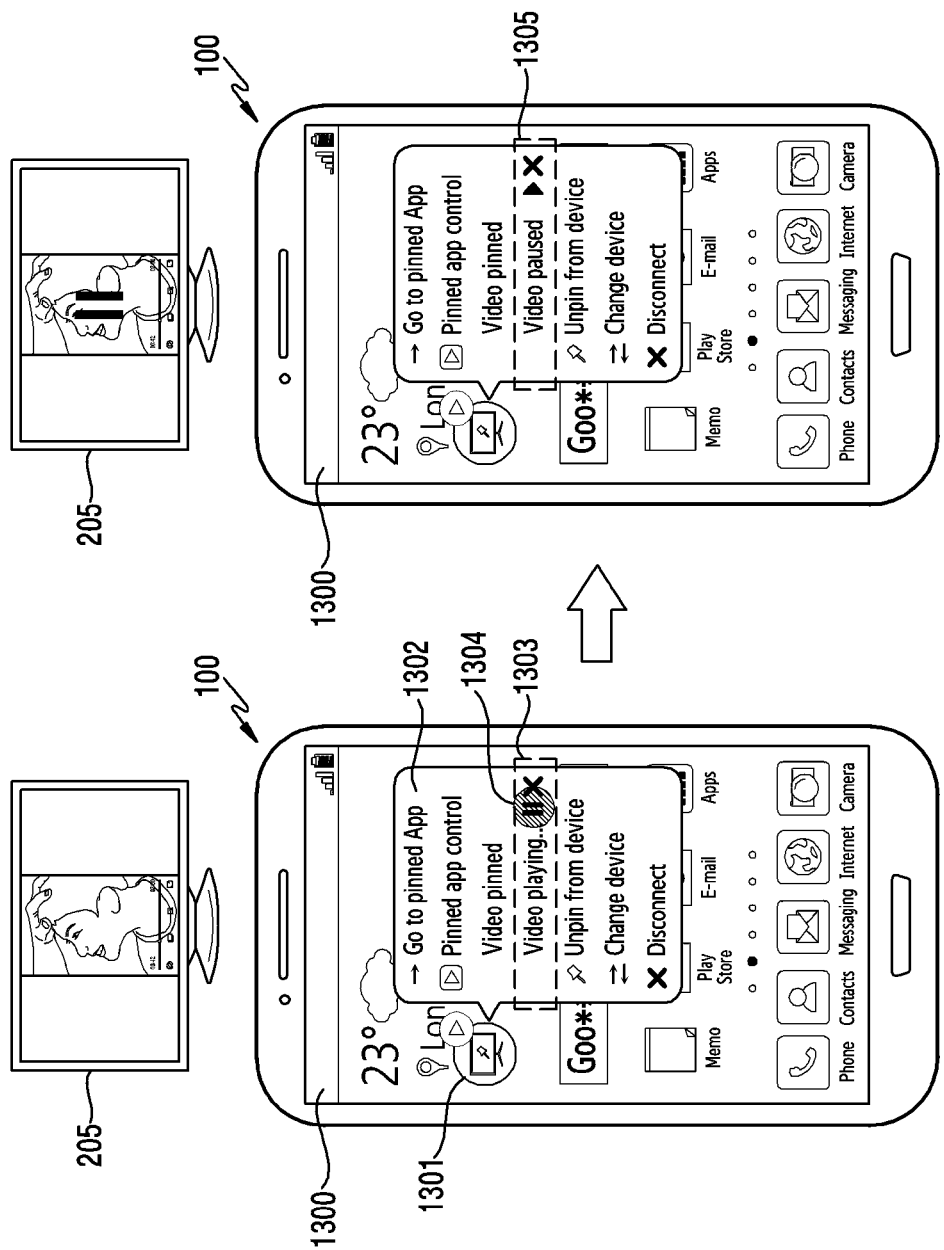
FIG. 13 illustrates another example of the function linked to the object for the pin mode according to various embodiments.

FIG. 13 illustrates another example of the function linked to the object for the pin mode according to various embodiments. The function may be performed by the electronic device 100 illustrated in FIG. 1.

Referring to FIG. 13, the electronic device 100 may be connected to the external electronic device 205 in order to share a screen related to a video application through the pin mode. Meanwhile, the electronic device 100 may display a screen 1300 while executing the video application in a background state. The external electronic device 205 may display the screen related to the video application on the basis of data received from the electronic device 100.

Meanwhile, the electronic device 100 may display an object 1301 for the pin mode on a wallpaper such as the screen 1300. The object 1301 may include an element indicating that the video application is configured as the pin mode in the electronic device 100.

The electronic device 100 may display a menu window 1302 in response to sensing of the input on the object 1301 floated on the screen 1300.

The menu window 1302 may include an item for directly accessing the video application configured as the pin mode, an item 1303 for controlling the video application configured as the pin mode in the current display state without separate screen switching, an item for stopping the pin mode of the video application, an item for changing the device linked to the pin mode of the video application, and an item for terminating the connection with the device linked to share the screen.

The item 1303 may include various objects for directly controlling the video application. In some embodiments, the item 1303 may include an object for temporarily stopping or reproducing content of the video application being displayed on the external electronic device 205, as illustrated in FIG. 13. According to embodiments, the item 1303 may further include one or more of an object for changing the content of the video application to other content, an object for controlling the reproduction time of the video application, an object for controlling the output volume of the reproduced content, and an object for controlling the picture quality of the reproduced content.

The electronic device 100 may receive an input 1304 on the object for temporarily stopping the content of the video application included in the item 1303. The electronic device 100 may change a pause image within the object for temporarily stopping the content to a reproduction image in response to reception of the input 1304 on the object for temporarily stopping the content. Further, the electronic device 100 may update a state display phrase within the item 1303 in response to reception of the input for the object for temporarily stopping the content. In other words, the electronic device 100 may change the item 1303 to the item 1305. The item 1305 may include a phrase "video paused . . . " in place of the phrase "video playing . . . ". The electronic device 100 may change the state of the content being displayed on the external electronic device 205 from the reproduction state to the temporary stop state in response to reception of the input 1304 for the object for temporarily stopping the content. In other words, the electronic device 100 may transmit a temporary stop command of the content to the video application without switching the video application executing in the background state to the foreground state.

As described above, the electronic device 100 according to various embodiments may control the application without switching the state of the application shared with the external electronic device 205 and executing in the background state to the foreground state by providing the item 1303 in the pin mode. In other words, the electronic device 100 according to various embodiments may display the item 1303 so that the user can more conveniently access the application related to the screen shared with the external electronic device 205.

Figure 14:
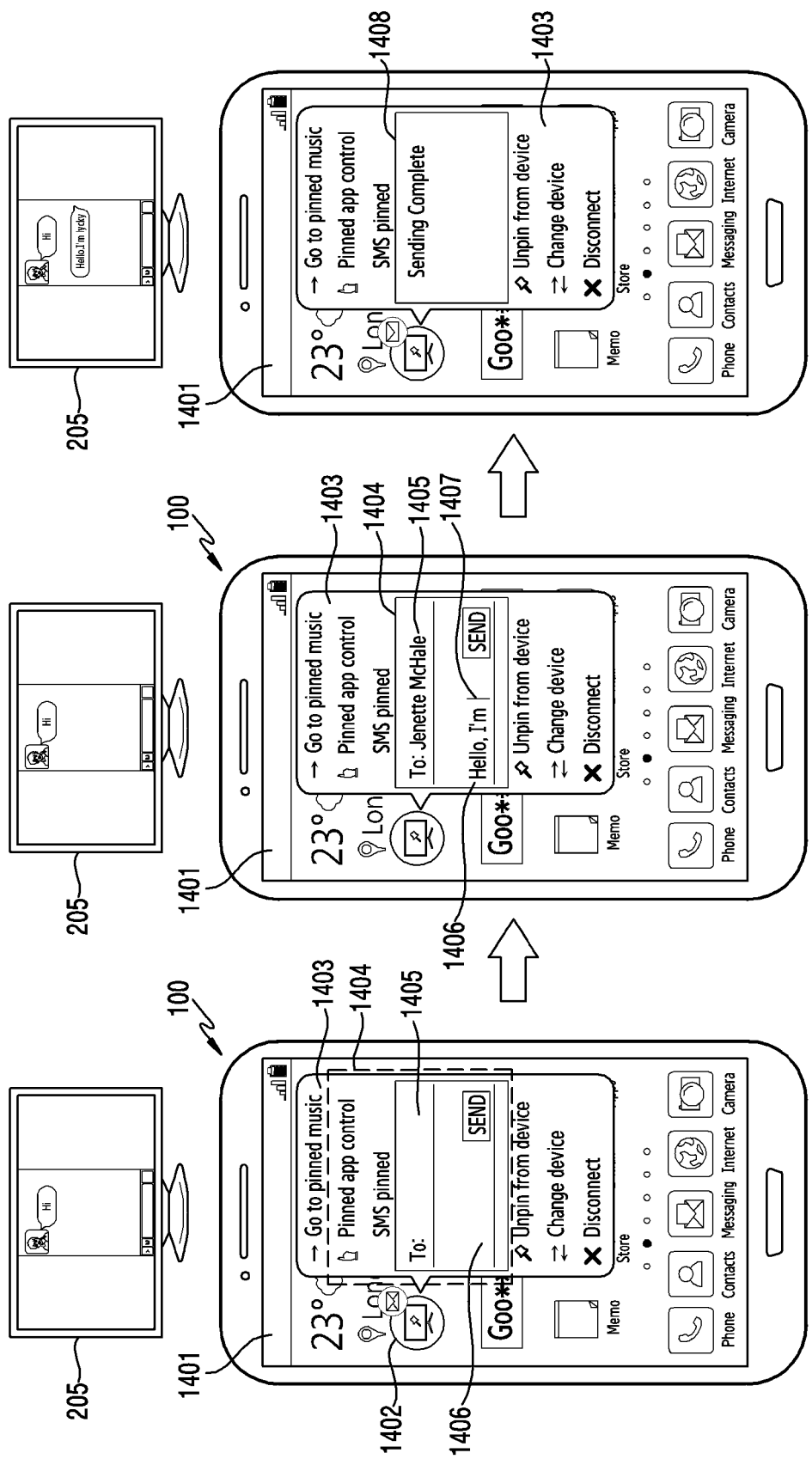
FIG. 14 illustrates another example of the function linked to the object for the pin mode according to various embodiments.

FIG. 14 illustrates another example of the function linked to the object for the pin mode according to various embodiments. The function may be performed by the electronic device 100 illustrated in FIG. 1.

Referring to FIG. 14, the electronic device 100 may be connected with the external electronic device 205 in order to share a screen related to a message application through the pin mode. The electronic device 100 may display a screen 1401 while executing the message application in the background state. Meanwhile, the external electronic device 205 may display the screen related to the text message application on the basis of data received from the electronic device 100.

The electronic device 100 may display an object 1402 for the pin mode floated on the screen 1401. The object 1402 may include an element indicating that the message application is configured as the pin mode.

The electronic device 100 may display a menu window 1403 in response to sensing of the input on the object 1402.

The menu window 1403 may include a shortcut to the message application configured as the pin mode, an item 1404 for controlling the message application configured as the pin mode without separate screen switching, an item for stopping the pin mode of the message application, an item for changing the target device to receive data on the message application, and an item for terminating the connection) with the current target device.

The item 1404 may include at least one window for directly controlling the message application. For example, the item 1404 may include a window 1405 for inputting a sender and a window 1406 for inputting words to be included in the message. Although not illustrated in FIG. 14, the item 1404 may further include a window for displaying abstract information of the received message. In other words, the electronic device 100 may display more windows within the item 1404 on the basis of the size of a display area.

The electronic device 100 may specify the receiver of the message to be transmitted from the electronic device 100 through an input in the window 1405. For example, although not illustrated in FIG. 14, the electronic device 100 may display a window that overlaps at least a portion of the screen 1401, the object 1402, or the menu window 1403 in response to reception of the input in the window 1405. The window may be used to search for a phone number stored in the electronic device 100. Although not illustrated in FIG. 14, the electronic device 100 may further display a virtual keypad for inputting a phone number or a name. For example, the electronic device 100 may specify "Jenette Mchale" as the receiver of the message to be transmitted from the electronic device 100 on the basis of at least one input in the window 1405.

The electronic device 100 may determine the words to be included in the message to be transmitted in response to reception of the input in the window 1406. For example, although not illustrated in FIG. 14, the electronic device 100 may display a virtual keypad that overlaps at least a portion of the screen 1401, the object 1402, or the menu window 1403 in response to reception of the input in the window 1406. The electronic device 100 may display words to be included in the message to be transmitted in the window 1406 by identifying the input on the displayed virtual keypad. For example, the electronic device 100 may display "Hello I'm" in the window 1406 on the basis of a user input. The electronic device 100 may display a cursor 1407 in order to indicate the location at which words input through a keypad are to be displayed.

In another example, the electronic device 100 may input a receiver of the message to be transmitted and content of the message to be transmitted through a voice input. In this case, the electronic device 100 may display a processing result according to the voice input through the window 1405 and the window 1406.

The electronic device 100 may transmit a message written through the item 1403 to another electronic device in response to reception of the input on an object "send" included in the window 1406. The other electronic device may be a device carried by a specific user through the input in the window 1405.

The electronic device 100 may display a notification indicating whether message transmission is completed normally. In some embodiments, when the message transmission is completed normally, the electronic device 100 may display a notification 1408 indicating that the message has been transmitted normally. In other words, the electronic device 100 may display a notification 1408 indicating "sending complete". In an embodiment, a notification message such as the notification 1408 may be displayed in an area of the item 1404. In another embodiment, the notification message may be displayed in an indicator area on an upper part of the display unit 120. However, this is not limiting. In other embodiments, when the message transmission is not completed normally, the electronic device 100 may display a notification indicating that the message has not been transmitted normally. In other embodiments, the electronic device 100 may display a visual effect, perform a haptic effect, or output a sound in order to indicate whether the message has been transmitted normally. For example, the electronic device 100 may generate a visual effect generating vibration of one or more of the object 1402, the menu window 1403, and the item 1404 in order to indicate that the message has been transmitted normally. In another example, the electronic device 100 may vibrate to indicate that the message has been transmitted normally. In another example, the electronic device 100 may emit a physical indicator including a light-emitting device in a specific color or output a sound in order to indicate that the message has been transmitted normally. However, this is not limiting.

Meanwhile, the external electronic device 205 may display the message transmitted normally from the electronic device 100 to the other electronic device. In other words, the external electronic device 205 displays the text message application configured as the pin mode, and thus may update display of the message transmitted by the electronic device 100 on the basis of the input on the item 1404.

As described above, the electronic device 100 according to various embodiments may control the application configured as the pin mode without switching the application configured as the pin mode from the background state to the foreground state by displaying the item 1404.

As illustrated in FIGS. 13 and 14, the electronic device 100 may adaptively change the configuration of the item for directly controlling the application configured as the pin mode according to the type or the function of the application configured as the pin mode. For example, when the application configured as the pin mode is associated with music, the electronic device 100 may configure the item to include objects for triggering functions such as pause/play, rewind, volume control, music select/add. When the application configured as the pin mode is associated with a TV, the electronic device 100 may configure the item to include channel change and volume control.

Figure 15:
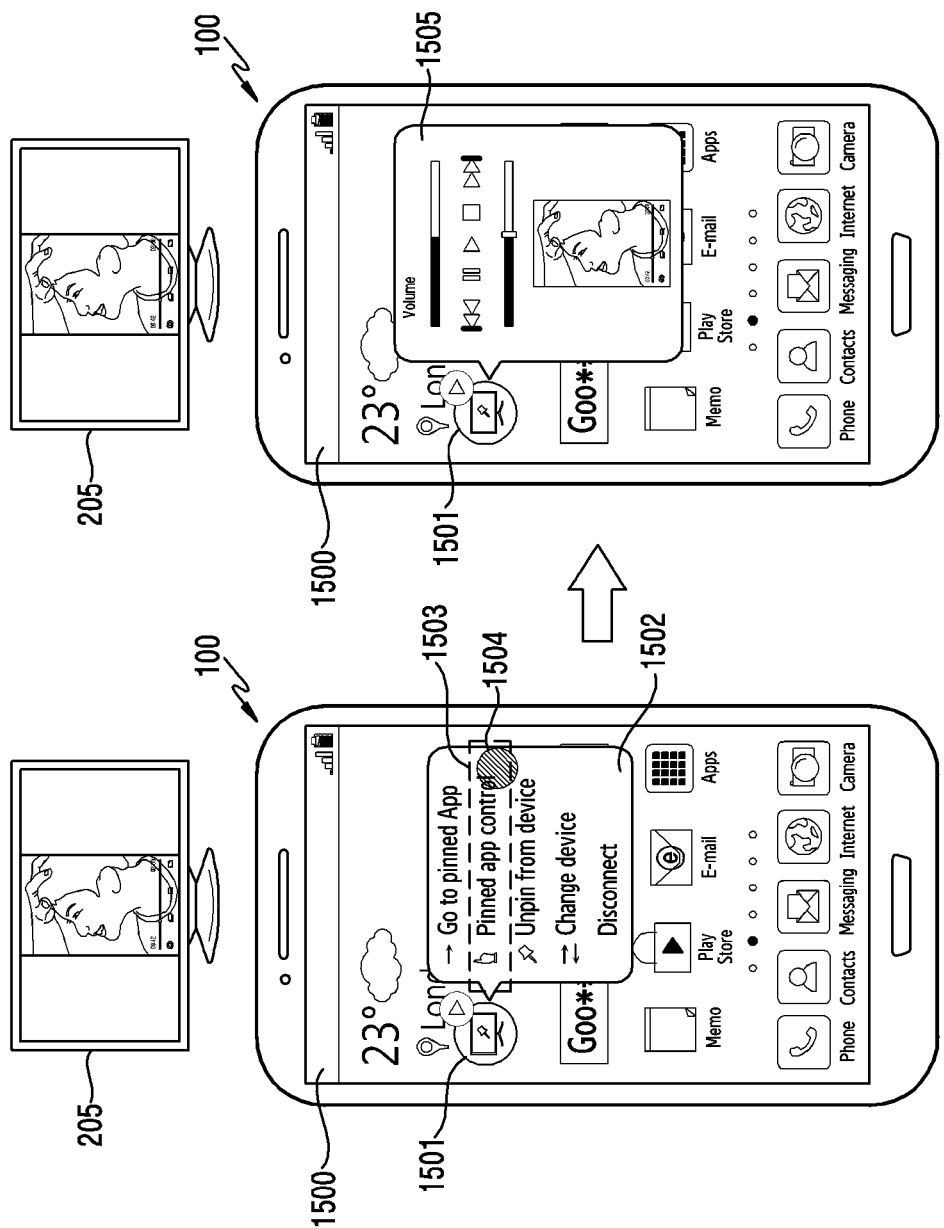
FIG. 15 illustrates another example of the function linked to the object for the pin mode according to various embodiments.

FIG. 15 illustrates another example of the function linked to the object for the pin mode according to various embodiments. The function may be performed by the electronic device 100 illustrated in FIG. 1.

Referring to FIG. 15, the electronic device 100 may be connected to the external electronic device 205 in order to share a screen related to a video application through the pin mode. The electronic device 100 may execute the video application in the background state while transmitting data on the video application configured as the pin mode to the external electronic device 205. Meanwhile, the external electronic device 205 may display the screen related to the video application on the basis of the data on the video application received from the electronic device 100.

The electronic device 100 may display a screen 1500 in the state in which the video application is executed in the background state. The screen 1500 may be a wallpaper. The electronic device 100 may display an object 1501 for the pin mode floated on the screen 1500. The object 1501 may include an element indicating that the video application is configured as the pin mode.

The electronic device 100 may display a menu window 1503 indicating functions connected to the object 1501 in response to reception of the input on the object 1501. The menu window 1503 may include an object for switching the application configured as the pin mode to the foreground state, an object 1504 for controlling the application configured as the pin mode, which is being executed in the background state, an object for stopping the pin mode of the application, an object for changing the device to display the screen related to the application configured as the pin mode, and an object for terminating the connection for screen sharing.

When the input on the object 1504 is received, the electronic device 100 may display a window 1505 for controlling the video application in the background state. The electronic device 100 may stop displaying the menu window 1503 and display the window 1505.

The window 1505 may include an object for controlling the screen and/or the sound output by the external electronic device 205. For example, the window 1505 may include an object in a bar format for controlling volume, one or more of objects for performing rewind, pause, play, stop, and forward functions, an object in a status-bar format indicating the current reproduction state of content being reproduced by the video application, or an object in a video format for displaying the current reproduction state of the content.

When the input on at least one of the various objects within the window 1505 is received, the electronic device 100 may perform at least one function corresponding to at least one object. In other words, the electronic device 100 may control the screen being displayed on the external electronic device 205 by controlling the application in the background state in response to sensing of the input on at least one object.

As described above, the electronic device 100 according to various embodiments may provide a direct control window different from the direct control item of the application configured as the pin mode illustrated in FIG. 13 and/or FIG. 14. The electronic device 100 may adaptively change the display format of the object (window or item) for directly controlling the application, operating in the background state and shared with the external electronic device 205, in consideration of the size of a margin area of the display unit 120 of the electronic device 100 and the total area of the display unit 120. For example, the electronic device 100 may display an object for providing more detailed information when it is determined that the total area of the display unit 120 is relatively wide, and may display an object for providing simplified information when it is determined that the margin area of the display unit 120 is somewhat insufficient.

Figure 16:
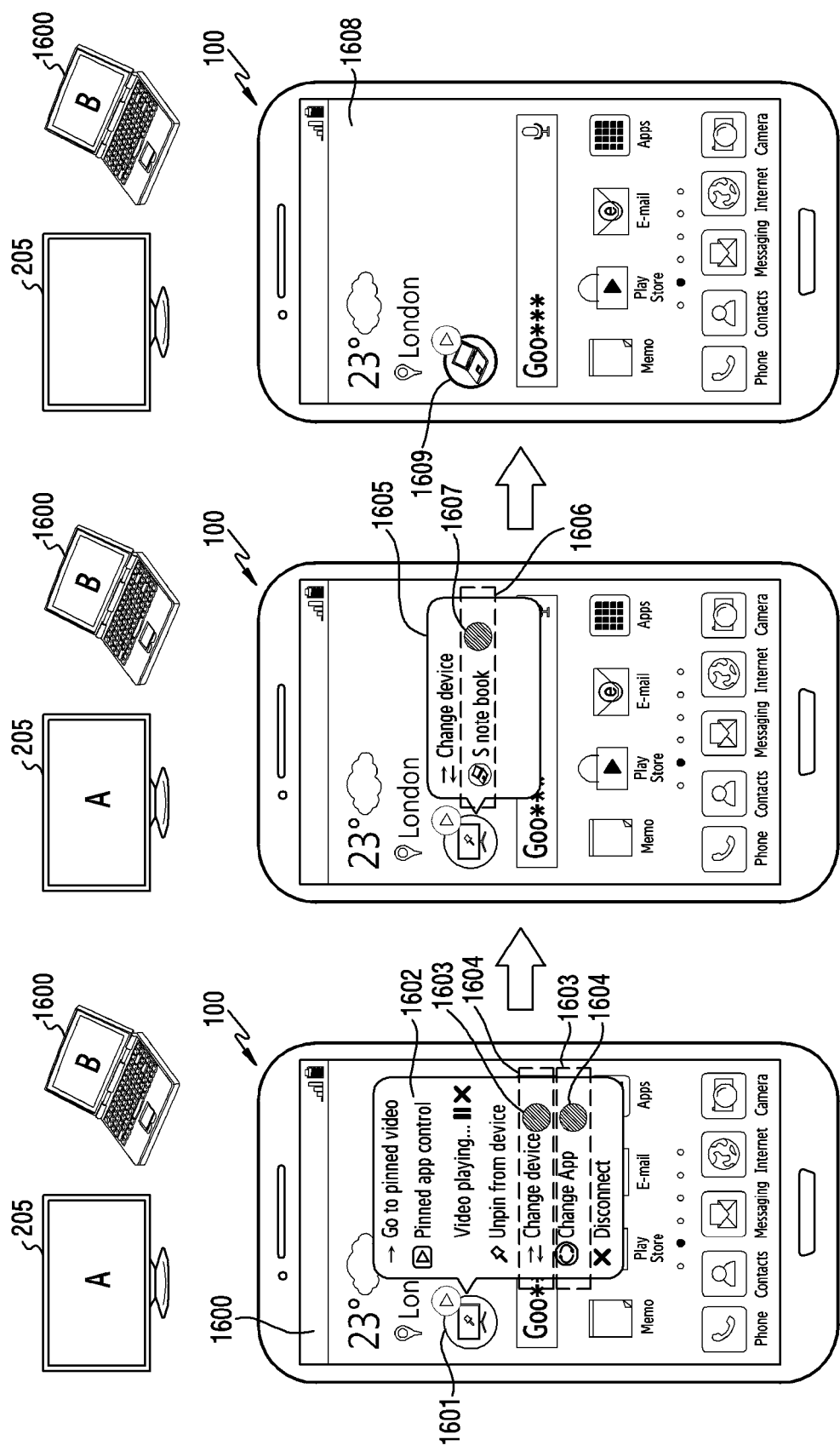
FIG. 16 illustrates another example of the function linked to the object for the pin mode according to various embodiments.

FIG. 16 illustrates another example of the function linked to the object for the pin mode according to various embodiments. The function may be performed by the electronic device 100 illustrated in FIG. 1.

Referring to FIG. 16, the electronic device 100 may share a screen related to a video application with the external electronic device 205 through the pin mode. The electronic device 100 may transmit information related to the screen of content reproduced through the video application to the external electronic device 205. The electronic device 100 may change the video application from the foreground state to the background state while transmitting the information to the external electronic device 205. Since the video application changed to the background state but was configured as the pin mode, the electronic device 100 may maintain transmission of the information. The electronic device 100 may display a screen 1600 in response to the change of the video application to the background state. For example, the screen 1600 may be a wallpaper. In another example, the screen 1600 may be a screen related to another application located in a layer lower than the layer of the screen of the content reproduced through the video application.

The electronic device 100 may display an object 1601 for the pin mode on the screen 1600. In some embodiments, the electronic device 100 may display the object 1601 floated on the screen 1600. The object 1601 may include at least one element indicating that the electronic device 100 is transmitting information for displaying a screen related to the video application to the external electronic device 205 through the pin mode.

The electronic device 100 may receive an input on the object 1601. The electronic device 100 may display a menu window 1602 in response to reception of the input on the object 1601. The menu window 1602 may include an icon for directly loading the pinned video application, an icon for directly controlling the pinned video application, an icon for releasing the pinned video application, an icon 1603 for changing the device with which to share the screen related to the video application, an icon for changing the application configured as the pin mode to another application, and an icon for terminating the connection with the device connected to the electronic device.

The electronic device 100 may receive an input 1604 on the icon 1603. When reception of the input 1604 is sensed, the electronic device 100 may display a window 1605 for providing information on devices positioned within the coverage of the electronic device 100 or a relay node connected to the electronic device 100 to the user.

In some embodiments, when the electronic device 100 shares the screen with at least one other device through direct communication, the electronic device 100 may identify reception strengths of signals received from neighboring devices of the electronic device 100 in response to sensing of the input 1604. The electronic device 100 may identify or determine at least one signal having a reception strength higher than or equal to a reference strength, among the signals. The reference strength may be a parameter configured to make data transmitted from the electronic device 100 to another device satisfy a quality of a predetermined level or higher. In other words, the reference strength may be a parameter for filtering another device having a channel state value or a channel quality value for the electronic device 100 lower than a predetermined value or another device spaced apart from the electronic device by a predetermined distance or more. In some embodiments, the electronic device 100 may determine the device with which to share the screen on the basis of a Channel State Indication or Information (CSI) or a Channel Quality Indication (CQI), rather than the reception strength.

In other embodiments, when the electronic device 100 shares the screen with at least one other device through a relay node, the electronic device 100 may transmit a message making a request for information on at least one other device with which the electronic device 100 shares the screen to the relay node connected to the electronic device in response to sensing of the input 1604. The relay node may transmit a response message including information on at least one other device that can share the screen with the electronic device 100 to the electronic device 100 in response to reception of the message. The electronic device 100 may identify or determine the device with which to share the screen on the basis of the response message.

The electronic device 100 may display information indicating the determined device in the window 1605. In some embodiments, the electronic device 100 may display an external electronic device transmitting a signal having a reception strength higher than or equal to a reference strength, like the item 1606. The item 1606 may be configured to include an image indicating the external electronic device 1600 transmitting the signal having the reception strength higher than or equal to the reference strength and text indicating the type and the brand (S) of the external electronic device 1600. Meanwhile, the external electronic device 1600 may operate in the state in which a screen unrelated to the electronic device 100 is displayed. Since the external electronic device 1600 operates while the external electronic device 1600 is not interworking with the electronic device 100, unlike the external electronic device 205, the external electronic device 1600 may display a screen unrelated to the electronic device 100. For example, the external electronic device 1600 may display its own wallpaper.

The electronic device 100 may be connected to the external electronic device 1600 on the basis of the pin mode in response to reception of the input 1607 for the item 1606. The electronic device 100 may transmit data for displaying a screen of content reproduced by the video application configured as the pin mode to the external electronic device 1600 connected through the pin mode. In other words, the electronic device 100 may display the screen related to the video application configured as the pin mode through the external electronic device 1600.

Meanwhile, the electronic device 100 may change a state of association between the external electronic device 205 and the electronic device 100 in response to reception of the input 1607. In some embodiments, the electronic device 100 may disconnect the connection between the external electronic device 205 and the electronic device in response to reception of the input 1607. In this case, screen C of the external electronic device 205 of FIG. 16 may be an empty screen or a default screen of the external electronic device 205. In other embodiments, the electronic device 100 may release only the pin mode in the state in which the connection between the external electronic device 205 and the electronic device is maintained in response to reception of the input 1607. In other words, the electronic device 100 may transmit data on the screen that the electronic device 100 is currently displaying, rather than the screen related to the video application, to the external electronic device 205. In this case, screen C of the external electronic device 205 of FIG. 16 may correspond to the screen 1600 of the electronic device 100. In other embodiments, the electronic device 100 may maintain the connection with the external electronic device 205 based on the pin mode. In other words, the electronic device 100 may be connected to the external electronic device 205 and the external electronic device 1600 through the pin mode in response to reception of the input 1607. In this case, screen C of the external electronic device 205 of FIG. 16 may be the screen related to the video application.

The electronic device 100 may change the object 1601 in response to reception of the input 1607. For example, when the electronic device 100 terminates the connection with the external electronic device 205 and establishes only the connection with the external electronic device 1600 in response to reception of the input 1607, the electronic device 100 may display an object 1609 for the pin mode changed from the object 1601. In other words, the electronic device 100 may generate the object 1609 by updating the changed state of the object 1601. The object 1609 may include at least one element indicating that the application configured as the pin mode is the video application and that the type of the device connected through the pin mode is a notebook.

Since the electronic device 100 is connected to the external electronic device 1600 on the basis of the pin mode, the external electronic device 1600 may maintain display of the screen related to the video application even though the electronic device 100 switches from the screen 1600 to the screen 1609.

As described above, the electronic device 100 according to various embodiments may provide a function for changing the device with which to share the screen to another device through an item within a menu for the object for the pin mode. The electronic device 100 may provide higher convenience to the user by providing the function.

Figure 17:
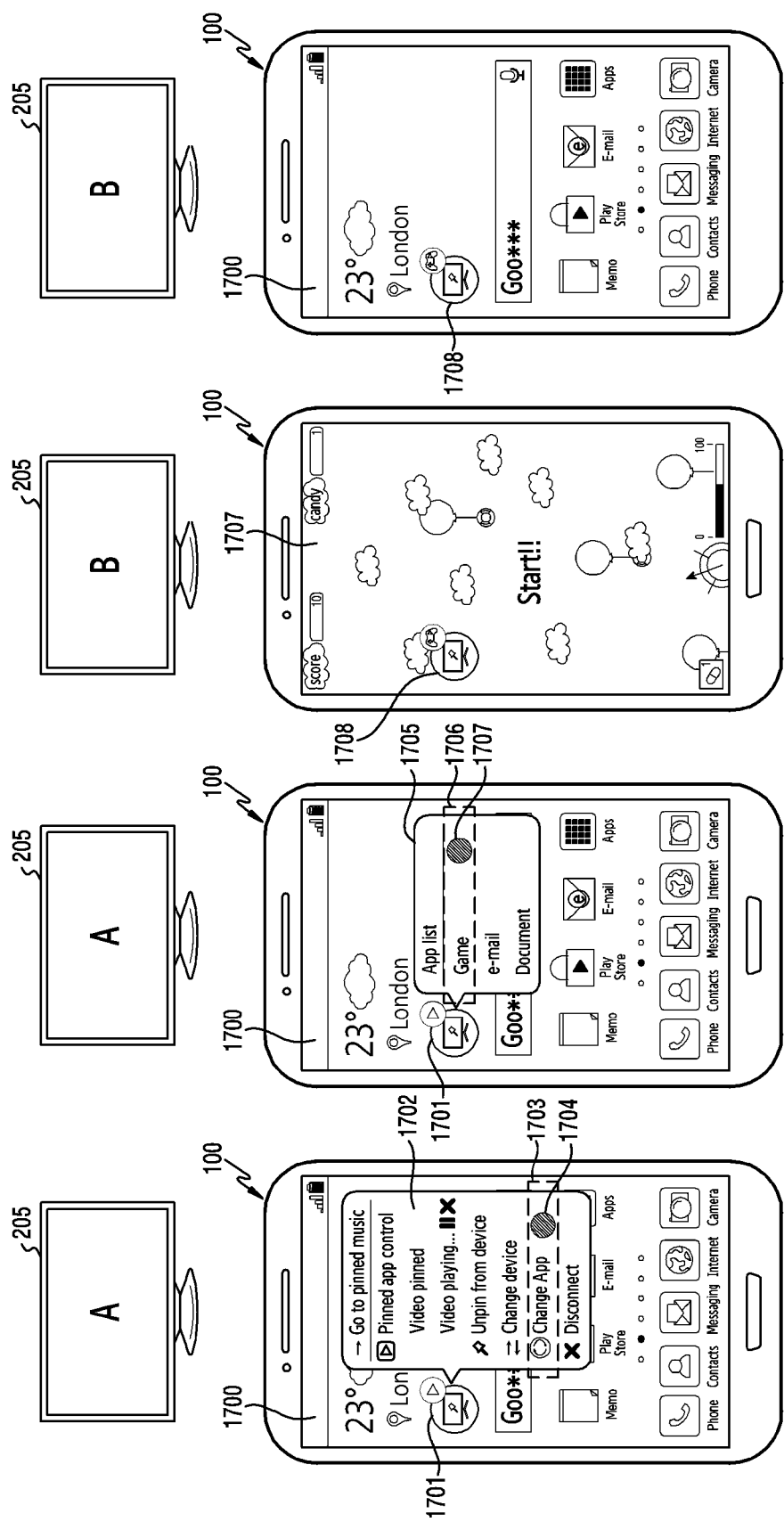
FIG. 17 illustrates another example of the function linked to the object for the pin mode according to various embodiments.

FIG. 17 illustrates another example of the function linked to the object for the pin mode according to various embodiments. The function may be performed by the electronic device 100 illustrated in FIG. 1.

Referring to FIG. 17, the electronic device 100 may share a screen related to a video application configured as the pin mode with the external electronic device 205. The electronic device 100 may display a screen 1700 which is unrelated to the screen of the video application. The electronic device 100 may display an object 1701 for the pin mode overlapping the screen 1700. The object 1701 may include at least one element indicating that the electronic device 100 is connected to the external electronic device 205 and that the video application is configured as the pin mode.

Upon receiving the input on the object 1701, the electronic device 100 may display a menu window 1702. The menu window 1702 may include at least one item for executing various functions linked to the object 1701 and an item 1703 for changing the application configured as the pin mode to another application.

In some embodiments, the electronic device 100 may display a window 1705 in response to reception of the input 1704 on the item 1703. The window 1705 may be displayed to guide the electronic device 100 to change the application configured as the pin mode to another application. The window 1705 may include at least one object indicating at least one application that the electronic device 100 can configure as the pin mode. For example, the window 1705 may include an object 1706 indicating a game application, an object indicating an email application, and an object indicating a document.

The applications indicated by the objects included in the window 1705 may be configured by various methods. For example, the applications may be applications configured by the user. In another example, the applications may be applications currently executed by the electronic device 100. In another example, the applications may be applications executed by the electronic device 100 for a time within a preset time from the current time. In another example, the applications may be applications that can be shared with another device. However, this is not limiting.

The electronic device 100 may receive an input on one of the objects included in the window 1705. For example, the electronic device 100 may receive an input on the object 1706. The input 1706 may be an input for changing the application configured as the pin mode from a first application (for example, a video application) to a second application (for example, a game application).

The electronic device 100 may execute the game application indicated by the object 1706 in response to reception of the input on the object 1706. The electronic device 100 may display a screen 1707 related to the game application. In some embodiments, the electronic device 100 may display an object 1708 floated on the screen 1707. The object 1708 may include an element indicating that the game application is configured as the pin mode, unlike the object 1701.

The electronic device 100 may transmit data related to the game application to the external electronic device 205 in response to reception of the input on the object 1706. The external electronic device 205 may display a screen corresponding to the screen 1707 related to the game application on the basis of the data received from the electronic device 100. In other words, the electronic device 100 may display the screen corresponding to the screen 1707 through the external electronic device 205 in response to reception of the input on the object 1706.

The electronic device 100 may switch from the screen 1707 to the screen 1700. For example, the electronic device 100 may switch from the screen 1707 to the screen 1700 in response to reception of the input on a home button of the electronic device 100. In other words, the game application configured as the pin mode may be switched to the background state. Since the game application is configured as the pin mode, the electronic device 100 may keep transmitting data related to the game application regardless of switching of the game application to the background state. The external electronic device 205 may continuously display the screen corresponding to the screen 1707 on the basis of data continuously received from the electronic device 100.

FIG. 17 illustrates an example of display of a separate application list to change the application configured as the pin mode, but this is only an example. The electronic device 100 according to various embodiments may change the application configured as the pin mode through another scheme. For example, after receiving the input on the object 1703, the electronic device 100 may change the application through a procedure similar to the procedure illustrated in FIG. 2 or 3 (that is, the procedure for configuring the application as the pin mode).

As described above, the electronic device 100 according to various embodiments may provide higher convenience to the user by providing the object for changing the application configured as the pin mode. Further, the electronic device 100 may adaptively respond to a change in the conditions in the vicinity of the user of the electronic device by providing the object for changing the application configured as the pin mode.

Figure 18:
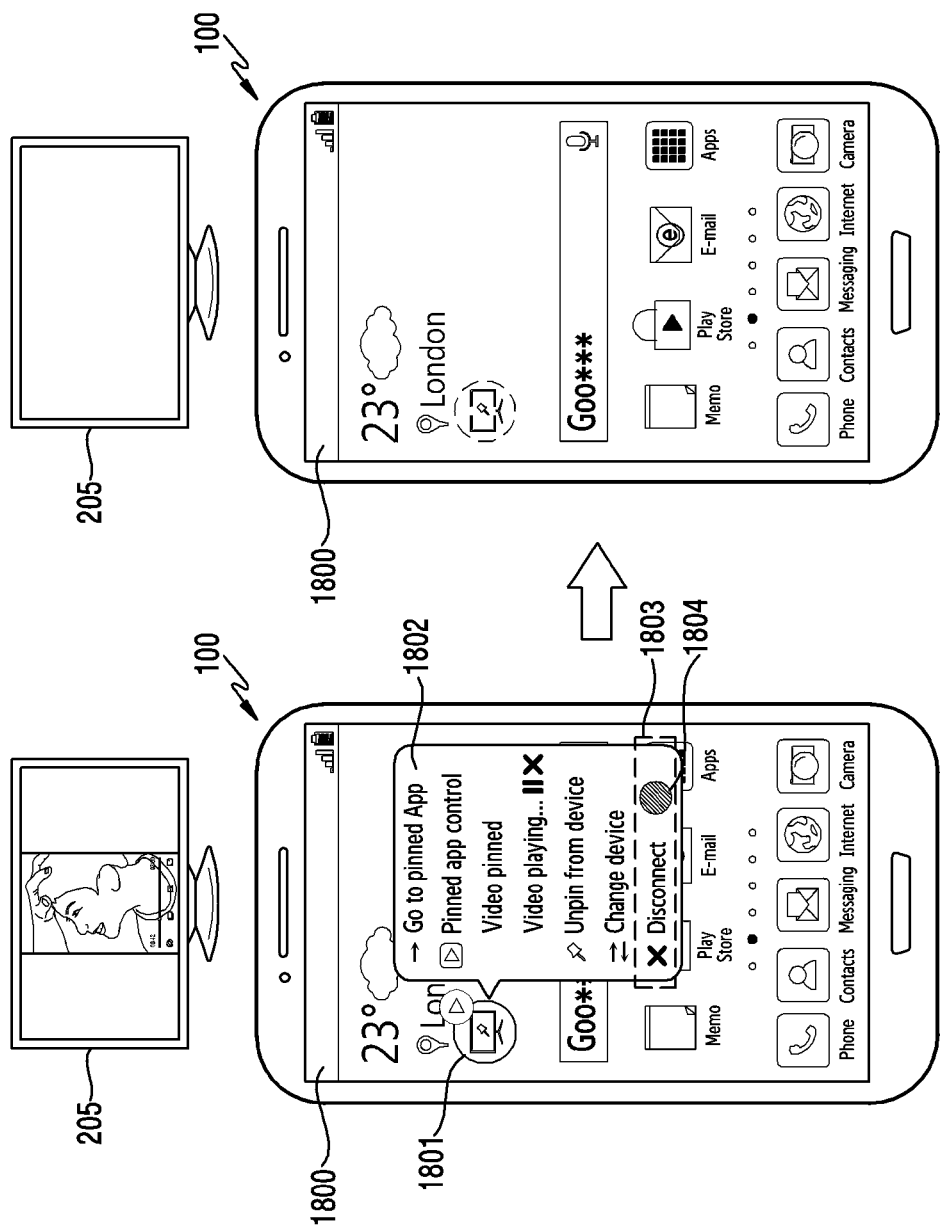
FIG. 18 illustrates another example of the function linked to the object for the pin mode according to various embodiments.

FIG. 18 illustrates another example of a function linked to the object for the pin mode according to various embodiments. The function may be performed by the electronic device 100 illustrated in FIG. 1.

Referring to FIG. 18, the electronic device 100 may output a screen related to a video application to the external electronic device 205 through the pin mode. The electronic device 100 may display a screen 1800 different from the screen output to the external electronic device 205. The electronic device 100 may display an object 1801 for the pin mode floated on the screen 1800. The object 1801 for the pin mode may include an element indicating the type of the external electronic device 205 and an element indicating the application configured as the pin mode.

The electronic device 100 may display a menu window 1802 on the basis of the input on the object 1801. The menu window 1802 may be used to trigger the object 1801 or various functions related to the pin mode. The menu window 1802 may include an item 1803 for terminating, disconnecting, or stopping the connection with the external electronic device 205. According to embodiments, the menu window 1802 may further include items for triggering other functions.

The electronic device 100 may receive an input 1804 on the item 1803. The electronic device 100 may disconnect communication for sharing the screen with the external electronic device 205 in response to reception of the input 1804 on the item 1803. In other words, in connection with screen sharing, the association between the electronic device 100 and the external electronic device 205 may disappear, or may be terminated.

The electronic device 100 may stop transmitting data to the external electronic device 205 in response to reception of the input 1804. The external electronic device 205 may stop displaying the screen related to the electronic device 100 due to the stoppage of data transmission.

In some embodiments, the electronic device 100 may stop displaying the object 1801 in response to reception of the input 1804. When there is no device connected to the electronic device 100 to share the screen due to reception of the input 1804, the electronic device 100 may stop displaying the object 1801.

As described above, the electronic device 100 according to various embodiments may provide higher convenience to the user by providing a quick menu for disconnecting communication with the external electronic device without separate screen switching.

Figure 19A:
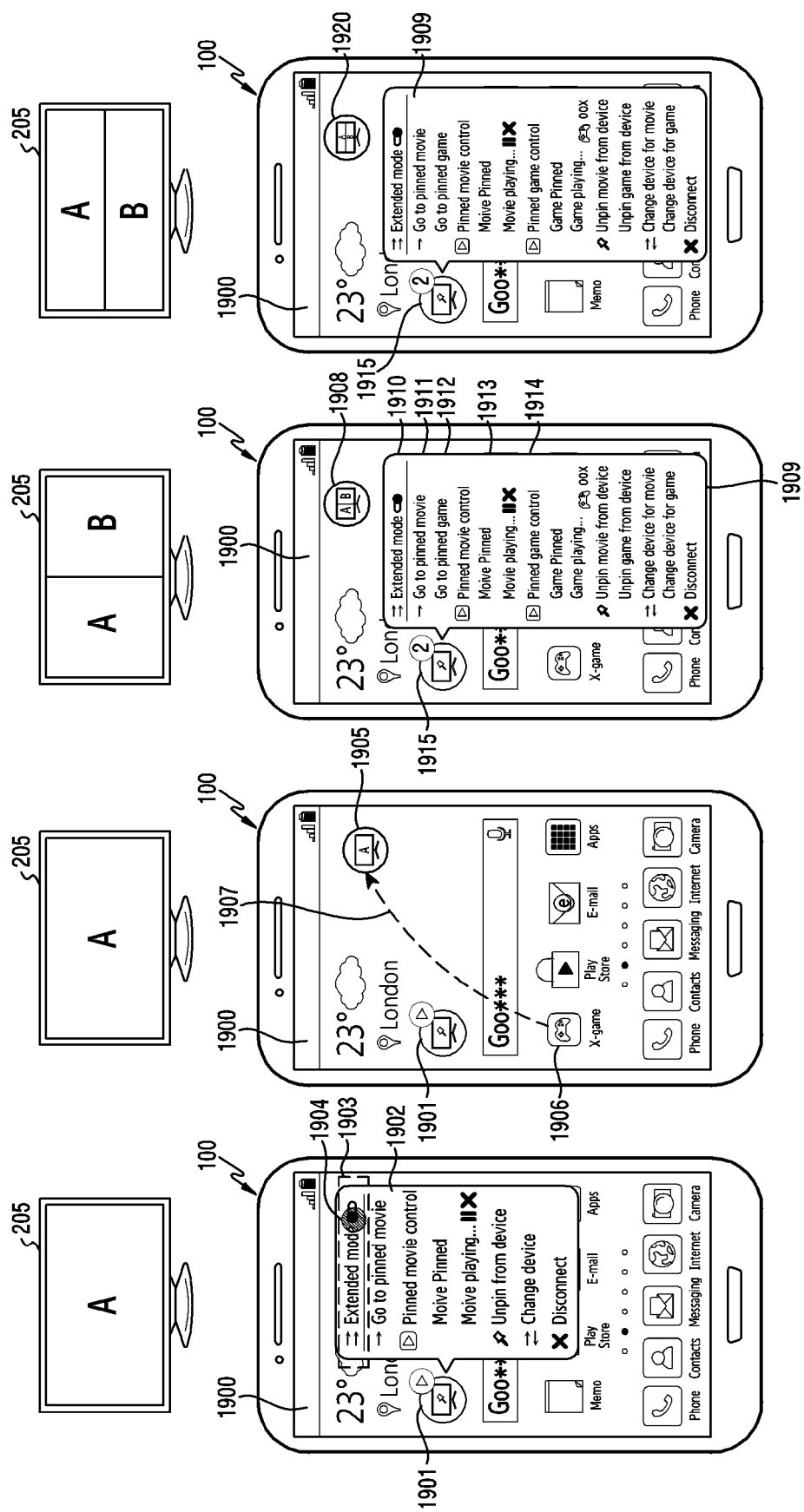
FIG. 19A illustrates another example of the function linked to the object for the pin mode according to various embodiments.

FIG. 19A illustrates another example of the function linked to the object for the pin mode according to various embodiments. The function may be performed by the electronic device 100 illustrated in FIG. 1.

Referring to FIG. 19A, the electronic device 100 may transmit data related to a video application configured as the pin mode to the external electronic device 205. The external electronic device 205 may display a screen of content reproduced by the video application configured as the pin mode on the basis of data received from the electronic device 100.

The electronic device 100 may display a screen 1900. The screen 1900 may not be related to the video application. For example, the screen 1900 may be a wallpaper. The screen 1900 may include an object 1901 for the pin mode including an element indicating that the video application is configured as the pin mode. The electronic device 100 may display a menu window 1902 in response to reception of the input on the object 1901. The menu window 1902 may include items indicating functions that may be triggered by the object 1901. For example, the object 1901 may include an item 1903 for executing an extended mode. The extended mode may be a mode for using the screen of the external electronic device 205 as an extended screen of the electronic device 100. For example, when the input for moving at least some of the objects displayed on the electronic device 100 to the external electronic device 205 is received, the electronic device 100 may display at least some of the objects on the external electronic device 205. The extended mode may be a mode for widening the total area of the display unit 120 of the electronic device 100. The extended mode may be a mode for increasing the capability of the display unit 120 of the electronic device 100.

The electronic device 100 may receive an input 1904 on the item 1903. The input 1904 may be an input for changing the operation mode or the display mode of the electronic device to the extended mode. For example, the input 1904 may include an operation for moving a button included in the item 1903 from left to right. In another example, the input 1904 may include an operation for touching the item 1903.

The electronic device 100 may operate in the extended mode in response to reception of the input 1904. The electronic device 100 operating in the extended mode may display an object moved to the external electronic device 205 in response to reception of the input for moving a specific object to the external electronic device 205. For example, upon receiving the input for moving a specific window displayed on the electronic device 100 to the external electronic device 205 (for example, a drag for moving a specific window to a corner or an edge part of the display unit 120 of the electronic device 100), the electronic device 100 operating in the extended mode may display the specific window on the external electronic device 205. In an embodiment, the application related to the specific window moved to the external electronic device 205 may be configured as the pin mode. In another example, the application related to the specific window moved to the external electronic device 205 may not be configured as the pin mode. In other words, the external electronic device 205 may display the screen related to the application configured as the pin mode on one side of the display unit of the external electronic device 205 and perform mirroring of the display screen of the electronic device 100 on another side.

In some embodiments, the electronic device 100 may display an object 1905 indicating operation in the extended mode in response to reception of the input 1904. In some embodiments, the electronic device 100 may stop displaying the window 1902.

In some embodiments, the object 1905 may indicate a display state of the external electronic device 205. For example, the object 1905 may include an image indicating that the screen provided on the external electronic device 205 in the extended mode is displayed as a full screen. The object 1905 may include an image indicating the type of the device providing the extended mode.

The electronic device 100 may receive an input for moving a specific object within the electronic device to the vicinity of the object 1905. The specific object may be a window, an icon, or a screen. For example, the electronic device 100 may receive the input for moving the icon 1906 to the vicinity of the object 1905. In an embodiment, the electronic device 100 may identify where the moved icon 1906 approaches the object 1905 and is held (is dropped or overlaps). For example, when the icon 1906 is held (is dropped or overlaps) in the state in which the icon 1906 approaches the left side of the object 1905, the electronic device 100 may control the external electronic device 205 to display a screen related to the icon 1906 on the left side and display a reduced screen related to the video application currently being displayed as a full screen on the right side. In another example, when the icon 1906 is held in the state in which the icon 1906 approaches the lower side of the object 1905, the electronic device 100 may control the external electronic device 205 to display the screen related to the icon 1906 on the lower side and display the reduced screen related to the video application currently being displayed as a full screen on the upper side. In other words, the electronic device 100 may control the arrangement state of the screen for the object to be moved using the object 1905.

When the input on the icon 1906 is completed, the electronic device 100 may update the object 1905 in accordance with the arrangement state. For example, the electronic device 100 may change the shape of the object 1905 from a first shape to a second shape. For example, when the icon 1906 drops in the state in which the icon 1906 at least partially overlaps the left side of the object 1905, the electronic device 100 may display an object 1908 including an image indicating that the screen related to the icon 1906 is arranged on the left side and the existing display screen is arranged on the right side. Unlike this, when the icon 1906 drops in the state in which the icon 1906 at least partially overlaps the lower side of the object 1905, the electronic device 100 may display an object 1920 including an image indicating that the screen related to the icon 1906 is arranged on the lower side and the existing display screen is arranged on the upper side.

When the input on the icon 1906 is completed, the electronic device 100 may update the object 1901. The electronic device 100 may display an object 1915 for the pin mode indicating a change from the element indicating that the application configured as the pin mode is the video application to the element indicating that the number of applications configured as the pin mode is plural in response to completion of the input for the icon 1906.

Upon receiving the input for the object 1915, the electronic device 100 may display a menu window 1909. The menu window 1909 may include an item indicating an extended mode state, an item for executing a shortcut to the video application configured as the pin mode, an item for executing a shortcut to the game application configured as the pin mode (added through the extended mode), an item for directly controlling the video application, an item for directly controlling the game application, an item for releasing the pin mode of the video application, an item for releasing the pin mode of the game application, an item for changing the device for the pin mode of the video application, an item for changing the device for the pin mode of the game application, and an item for disconnecting from all or some of the devices connected to the electronic device 100.

As described above, the electronic device 100 may assign extendability to the display unit 120 of the electronic device 100 using the pin mode and a function linked to the object for the pin mode.

Figure 19B:
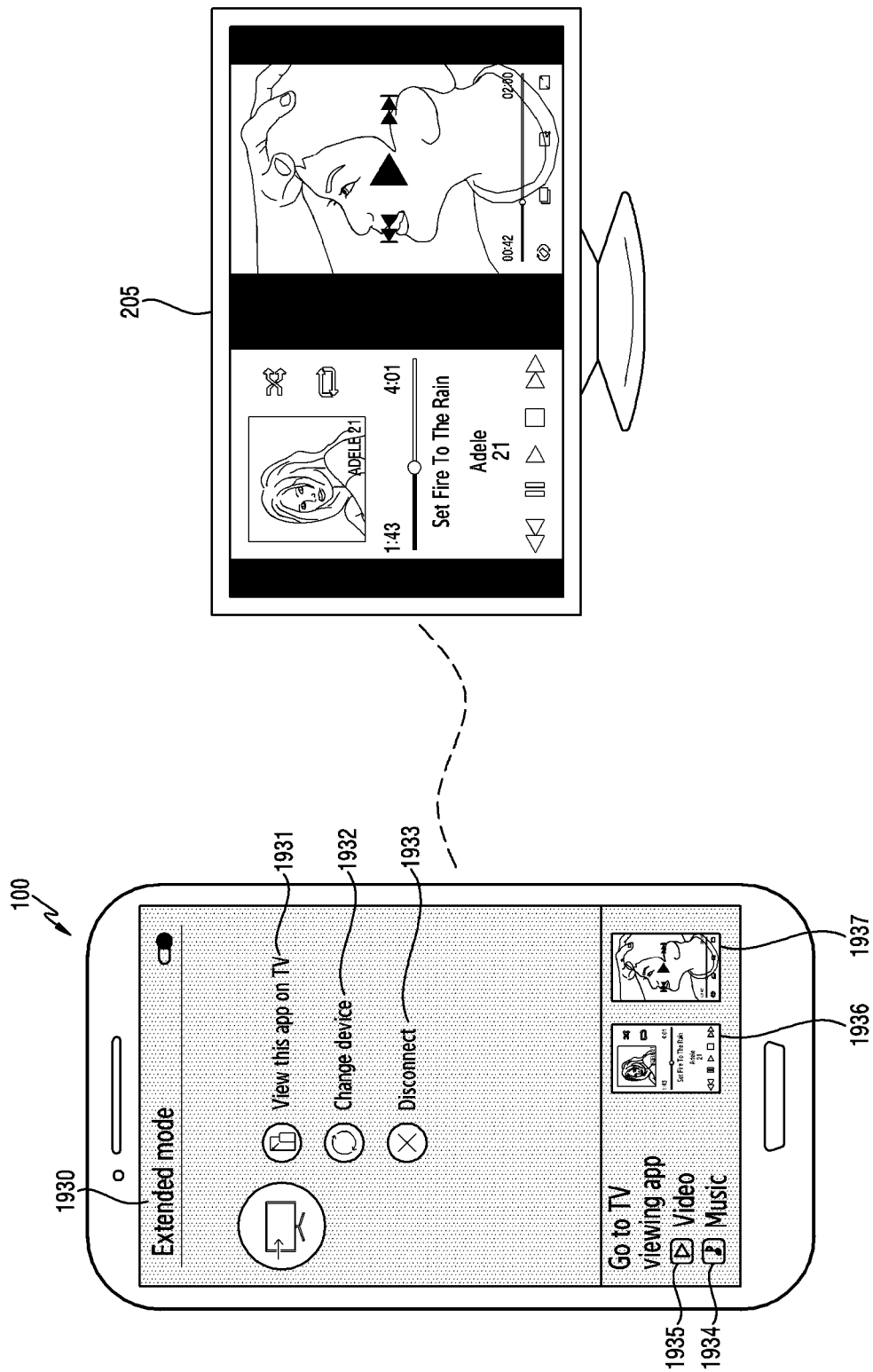
FIG. 19B illustrates another example of the function linked to the object for the pin mode according to various embodiments.

FIG. 19B illustrates another example of the function linked to the object for the pin mode according to various embodiments. The function may be performed by the electronic device 100 illustrated in FIG. 1.

Referring to FIG. 19B, the electronic device 100 may display a window 1930 for the extended mode in response to reception of the input for the extended mode. In some embodiments, the input for the extended mode may be a user input on the object 1905, 1909, or 1920. In other embodiments, the input for the extended mode may be a user input on the item 1904.

In some embodiments, the window 1930 may be translucent. In other embodiments, the window 1930 may be opaque.

The window 1930 may include an object 1931 for selecting a screen to be displayed (or additionally displayed) through the external electronic device 205 or an application related to the screen, an object 1932 for changing the external electronic device 205 to another electronic device, and an object 1933 for terminating the communication connection with the external electronic device 205.

The window 1930 may further include an object 1934 and an object 1935 for creating a shortcut to the application related to the screen currently being displayed on the external electronic device 205. For example, the object 1934 may be an object for creating a shortcut to a music application related to a screen currently being displayed on one side within the display unit of the external electronic device 205. In another example, the object 1935 may be an object for creating a shortcut to a video application related to the screen currently being displayed on another side within the display unit of the external electronic device 205.

The window 1930 may further include a thumbnail 1936 and a thumbnail 1937 indicating the positional relationship between a plurality of screens related to a plurality of applications currently being displayed on the external electronic device 205 and display states of the plurality of screens. For example, the electronic device 100 may indicate that the screen related to the music application is displayed on the left side of the external electronic device 205 and that the screen related to the video application is displayed on the right side through the arrangement states of the thumbnail 1936 and the thumbnail 1937.

In some embodiments, the electronic device 100 may change the arrangement states of the plurality of screens being displayed on the external electronic device 205 in response to reception of the thumbnail 1936 and an input for changing the arrangement states of the thumbnails. For example, upon receiving an input of placing and then dropping the thumbnail 1936 to the right of the thumbnail 1937, the electronic device 100 may transmit a control signal for instructing the external electronic device 205 to display the screen related to the music application on the right side and display the screen related to the video application on the left side. The external electronic device 205 may display the screen related to the music application in the right area of the display unit of the external electronic device 205 and display the screen related to the video application in the left area of the display unit of the external electronic device 205 on the basis of the control signal received from the electronic device 100.

The electronic device 100 may indicate a reproduction progress state of a song reproduced through the music application and a representative image through the thumbnail image 1936. The electronic device 100 may indicate a reproduction progress state of content (or a video) reproduced through the video application and a current reproduction screen through the thumbnail 1937.

Figure 20:
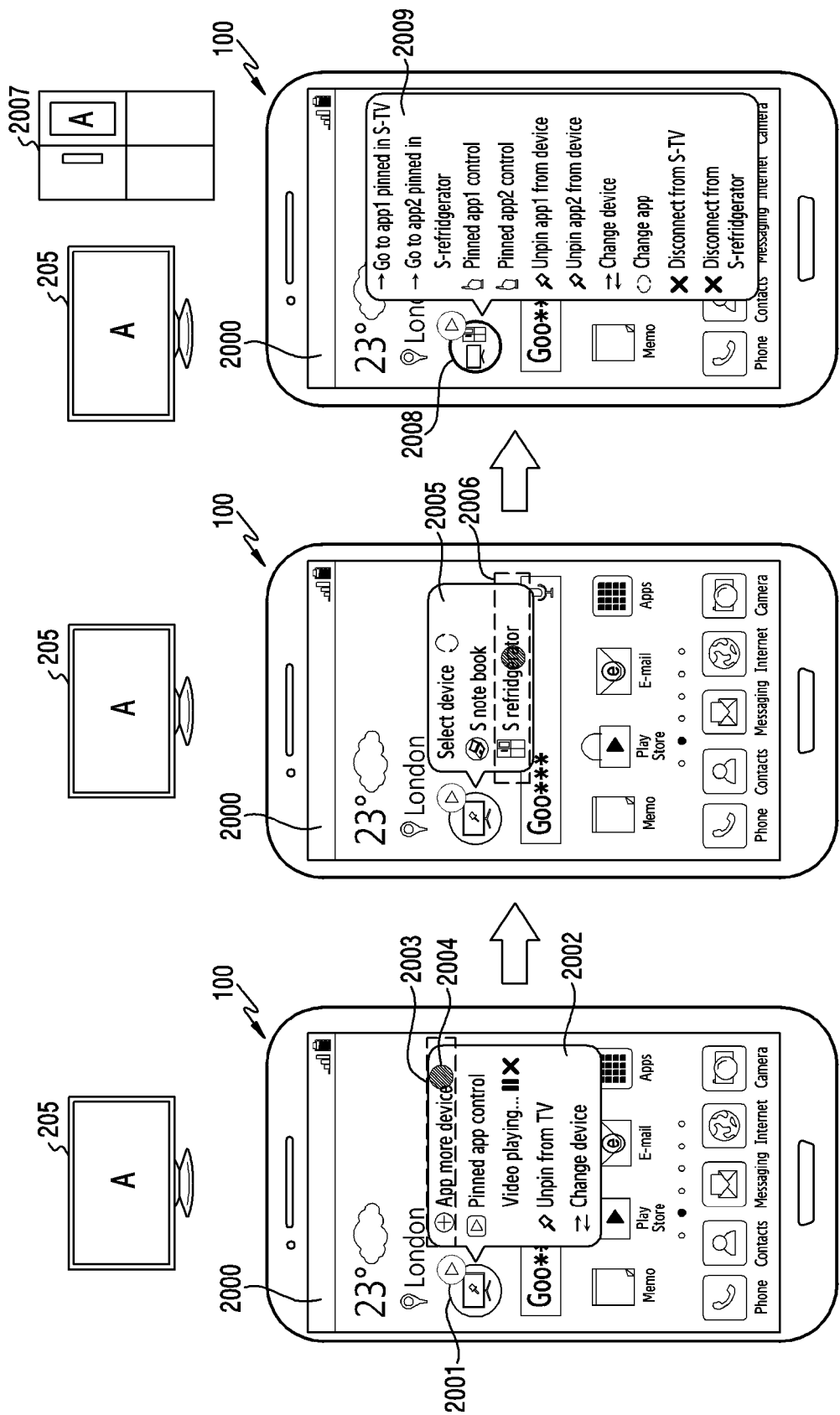
FIG. 20 illustrates another example of the function linked to the object for the pin mode according to various embodiments.

FIG. 20 illustrates another example of the function linked to the object for the pin mode according to various embodiments. The function may be performed by the electronic device 100 illustrated in FIG. 1.

Referring to FIG. 20, the electronic device 100 may be connected to the external electronic device 205 in order to display the screen related to the video application configured as the pin mode. The electronic device 100 may display a screen 2000 related to a wallpaper. The screen 2000 may include an object 2001 floated on the screen 2000. The electronic device 100 may display a menu window 2002 related to the object 2001 in response to sensing of the input on the object 2001. The menu window 2002 may include at least one area for activating at least one function linked to the object 2001. For example, the menu window 2002 may include an area 2003 for activating a function of determining a device additionally connected to the electronic device 100 on the basis of the pin mode. In other words, the electronic device 100 may display the screen related to the application configured as the pin mode not on only one device but on a plurality of devices.

The electronic device 100 may display a window 2005 for determining a device to be added in response to sensing of an input 2004 for the area 2003. In some embodiments, the electronic device 100 may stop displaying the menu window 2002 and display the window 2005. The window 2005 may include information on at least one device that the electronic device 100 can add for the pin mode. The operation for determining the at least one device may correspond to the operation described with reference to FIG. 16.

The window 2005 may include at least one area indicating at least one device to be added for the pin mode. For example, the window 2005 may include an area indicating the S notebook and an area indicating the S refrigerator. In some embodiments, each area included in the window 2005 may include an image indicating the device and text indicating the device.

The electronic device 100 may receive an input on the area 2006 included in the window 2005. The electronic device 100 may transmit the video application configured as the pin mode to the external electronic device 2007 in response to reception of the input on the area 2006. In other words, the electronic device 100 may configure the pin mode of the video application not only with the external electronic device 205 but also with an external electronic device 2007. The external electronic device 2007 may display a screen of content being reproduced through the video application on the basis of data received from the electronic device 100. In some embodiments, the screen displayed on the external electronic device 205 may correspond to the screen displayed on the external electronic device 2007.

As the external electronic device 2007 is added as the device connected for the pin mode, the object 2001 may be updated. For example, the electronic device 100 may display an object 2008 changed from the object 2001 including an image indicating the external electronic device 205. The object 2008 may include not only the image indicating the external electronic device 205 but also an image indicating the external electronic device 2007. In some embodiments, when the number of devices connected with the electronic device 100 through the pin mode is larger than or equal to a reference value, the electronic device 100 may display the number of devices connected with the electronic device 100 instead of the image indicating each device.

As the external electronic device 2007 is added as the device connected for the pin mode, the menu window 2002 may be updated. For example, after the external electronic device 2007 is added, the electronic device 100 may display a menu window 2009. The menu window 2009 may further include items for the external electronic device 2007, unlike the menu window 2002.

For example, the menu window 2009 may include an item for a shortcut to the application pinned in the external electronic device 205, an item for a shortcut to the application pinned in the external electronic device 2007, a direct control item of the application pinned in the external electronic device 205, a direct control item of the application pinned in the external electronic device 2007, an item for releasing the pin mode of the application pinned in the external electronic device 205, an item for releasing the pin mode of the application pinned in the external electronic device 2007, an item for terminating the connection with the external electronic device 205, and an item for terminating the connection with the external electronic device 2007.

FIG. 20 illustrates an environment in which the same application is pinned in the external electronic device 205 and the external electronic device 2007, but this is only an example for description. Through the operations illustrated in FIG. 2, 3, or 17, the electronic device 100 may independently configure the application pinned in the external electronic device 205 and the application pinned in the external electronic device 2007.

The electronic device 100 according to various embodiments may not only expand the screen of the electronic device 100 but may also provide a more flexible environment to the user through a multi-pin mode, in which the application is pinned in a plurality of devices.

Figure 21:
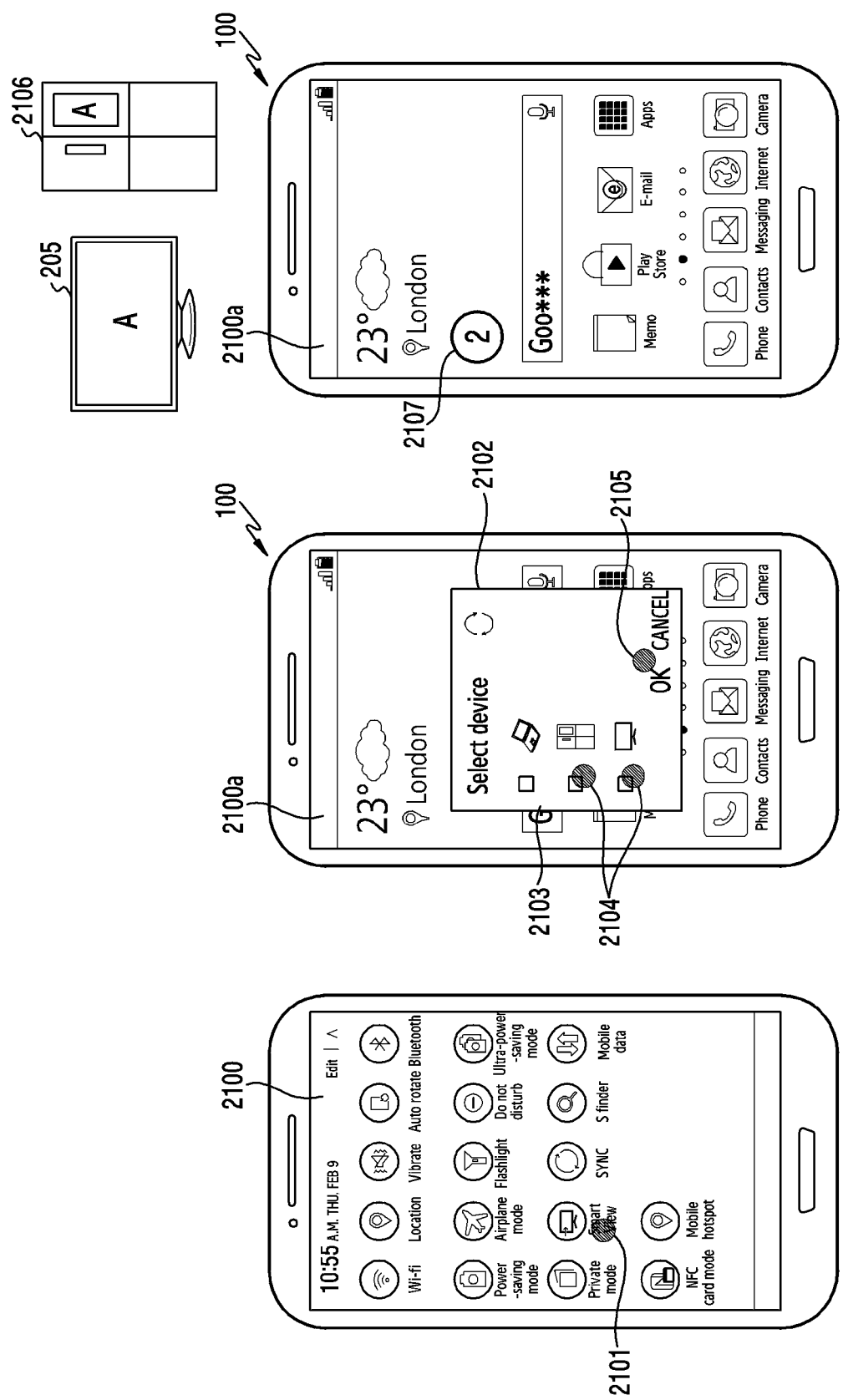
FIG. 21 illustrates an example of a function for determining a plurality of devices for a multi-pin mode according to various embodiments.

FIG. 21 illustrates an example of a function for determining a plurality of devices for a multi-pin mode according to various embodiments. The function may be performed by the electronic device 100 illustrated in FIG. 1.

Referring to FIG. 21, the electronic device 100 may display a User Interface (UI) 2100. The user interface 2100 may include an object (smart view) 2101 for establishing the connection with at least one external electronic device to share a screen therewith.

The electronic device 100 may display a window 2102 for selecting a device to share the screen of the electronic device 100 in response to reception of the input on the object 2101. The window 2102 may overlap a screen 2100a. The window 2102 may display information on at least one external electronic device determined through an operation similar to the operation described in connection with FIG. 16. For example, the window 2102 may display an image indicating a notebook, an image indicating a refrigerator, and an image indicating a TV as information on at least one determined external electronic device. Further, the window 2102 may include at least one object 2013 for receiving a user input for selecting all or some of at least one displayed external electronic device.

The electronic device 100 may receive a user input 2104 for selecting the refrigerator and the TV through at least one object 2103. Further, the electronic device 100 may receive an input 2105 for confirming selection of the refrigerator and the TV.

The electronic device 100 may establish each of the connection with the refrigerator (external electronic device 2106) and the connection with the TV (external electronic device 205) in response to reception of the input 2105. Further, the electronic device 100 may display an object 2107 for the pin mode floated on the screen 2100a in response to reception of the input 2105. In some embodiments, the object 2107 may include an image indicating the number of external electronic devices establishing the connection with the electronic device 100.

Meanwhile, since the pin mode is not configured in each of the external electronic device 205 and the external electronic device 2106, the external electronic device 205 and the external electronic device 2106 may display a screen having a configuration corresponding to the configuration of the screen 2100a currently being displayed on the electronic device. In other words, each of the external electronic device 205 and the external electronic device 2106 may perform mirroring on the screen 2100a. However, through operations corresponding to at least some of the operations according to the description of FIGS. 2, 3, and 16, the electronic device 100 may independently operate one or more of the display screen of the electronic device 100, the display screen of the external electronic device 205, or the display screen of the external electronic device 2106.

As described above, after establishing the connection with a specific device for the pin mode, the electronic device 100 may not only add another device but may also configure the pin mode with a plurality of devices in an initial connection establishment step.

Figure 22:
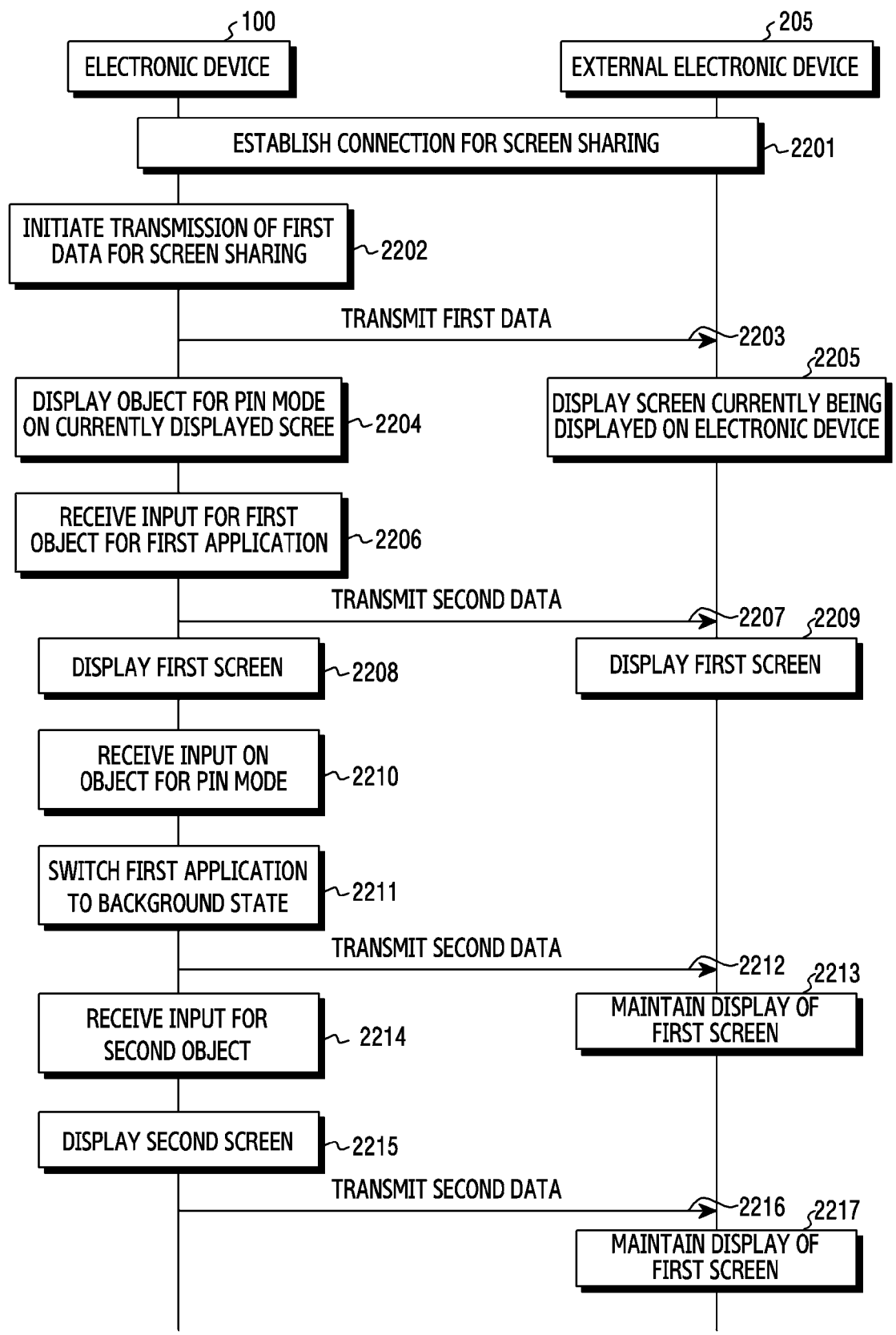
FIG. 22 illustrates signal flow between an electronic device and an external electronic device according to various embodiments.

FIG. 22 illustrates the signal flow between an electronic device and an external electronic device according to various embodiments. The signal flow may occur between the electronic device 100 illustrated in FIG. 1 and the external electronic device 205 illustrated in FIG. 2.

Referring to FIG. 22, in operation 2201, the electronic device 100 and the external electronic device 205 may establish the connection for screen sharing. The established connection may be performed by triggering of the electronic device 100 or triggering of the external electronic device 205. The established connection may be performed by triggering of another device, other than the electronic device 100 and the external electronic device 205.

In operation 2202, the electronic device 100 may initiate the transmission of first data for screen sharing in response to establishment of the connection. The first data may include information related to the current display screen of the electronic device 100.

In operation 2203, the electronic device 100 may transmit the first data to the external electronic device 205. The external electronic device 205 may receive the first data.

In operation 2204, the electronic device 100 may display an object for the pin mode on a currently displayed screen.

In operation 2205, the external electronic device 205 may display the screen that the electronic device 100 is currently displaying on the basis of the first data received from the electronic device 100. In other words, the external electronic device 205 may perform mirroring with the electronic device 100.

It should be noted that the order of operations 2203, 2204, and 2205 illustrated in FIG. 22 is only provided for description. Operations 2203 to 2205 may be performed simultaneously or performed regardless of the orders. Although FIG. 26 illustrates that the electronic device 100 transmits the first data at the time point at which operation 2203 is performed, the transmission of the first data may continue until the pin mode is configured (or applied). The first data may be data related to the screen displayed on the electronic device 100. In other words, when the screen displayed on the electronic device 100 changes, the information contained in the first data may also be changed.

In operation 2206, the electronic device 100 may receive an input on a first object for a first application.

In operation 2208, the electronic device 100 may display a first screen related to the first application in response to reception of the input on the first object. The external electronic device 205 may perform mirroring with the electronic device 100 and thus may display the first screen in operation 2209.

In operation 2210, the electronic device 100 may receive an input on the object for the pin mode. In other words, the electronic device 100 may configure the first application related to the currently displayed first screen as the pin mode. Since the electronic device 100 configured the first application as the pin mode, the electronic device 100 may transmit data for displaying the screen related to the first application on the external electronic device 205 to the external electronic device 205 regardless of whether the first application is switched to the background.

In operation 2211, the electronic device 100 may switch the first application to the background state on the basis of a user input or a change in the state of the electronic device 100. In other words, the electronic device 100 may output a screen unrelated to the first application through the display unit 120.

In operation 2212, the electronic device 100 may transmit second data. In other words, the electronic device 100 may transmit the second data for displaying the screen related to the first application on the external electronic device 205 regardless of whether the first application is switched to the background state.

In operation 2213, the external electronic device 205 may keep displaying the first screen. The external electronic device 205 operates in the state in which the first application is pinned and thus may keep displaying the first screen. Further, the external electronic device 205 receives the second data from the electronic device 100 and thus keeps displaying the first screen.

In operation 2214, the electronic device 100 may receive an input on a second object. For example, the second object may be related to a second application different from the first application.

In operation 2215, the electronic device 100 may display the second screen related to the second application in response to reception of the input for the second object. In other words, the electronic device 100 may display a screen different from that after operation 2211 is performed. However, since the electronic device 100 operates in the pin mode, the electronic device 100 may transmit the second data to the external electronic device 205 in operation 2216. In other words, the electronic device 100 may transmit the second data related to the first application configured as the pin mode to the external electronic device 205 regardless of the current state of the electronic device 100.

In operation 2217, the external electronic device 205 may keep displaying the first screen. Since the external electronic device 205 is connected to the electronic device 100 on the basis of the pin mode, the external electronic device 205 may keep displaying the first screen regardless of the display of the second screen of the electronic device 100.

As described above, the method by the electronic device according to various embodiments may include an operation of displaying an object having a first shape and floated on a first screen displayed on the electronic device, an operation of transmitting data for displaying the first screen on an external electronic device to the external electronic device, an operation of displaying the object having a second shape changed from the first shape in response to reception of the input on the displayed object, and an operation of displaying a second screen while transmission of the data is maintained in response to switching of a first application related to the first screen from a foreground state to a background state.

According to various embodiments, the method may further include an operation of displaying a plurality of items indicating functions executable through the object in response to reception of another input on the object, and the plurality of items may include at least one of an item indicating a function for switching the first application executed in the background state to the foreground state, an item indicating a function for stopping transmission of the data, an item indicating a function for changing a device connected to the electronic device to another external electronic device, an item for controlling the first application executed in the background state, and an item indicating a function for terminating the connection with the external electronic device. The plurality of items may be included in a message window next to the object in response to reception of other input.

According to various embodiments, when the first screen is associated with reproduction of content, the object having the second shape may include an element indicating the time point (timing) at which the content is reproduced in the external electronic device.

According to various embodiments, the object having the second shape may include a contour having a color indicating the first application.

According to various embodiments, the object having the second shape may include an image indicating the first application.

According to various embodiments, the object having the first shape may be generated based on establishment of a connection with the external electronic device.

According to various embodiments, the input may be used to enter a pin mode in which only the first screen related to the first application, among a plurality of applications being executed within the electronic device, is displayed on the external electronic device.

According to various embodiments, the method may further include an operation of displaying a window for displaying the first screen being displayed on the external electronic device in response to reception of another input on the object having the second shape, and the window may overlap the second screen.

As described above, the method by the electronic device according to various embodiments may include an operation of indicating that a first screen related to a first application executed in a background state is being displayed on an external electronic device connected to the electronic device based on data transmitted from the electronic device and displaying an object floated on a second screen being displayed on the electronic device.

Methods according to embodiments stated in claims and/or specifications of the disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, a component included in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. A mobile device, comprising:
a display;
communication circuitry; and
at least one processor electrically connected to the display and the communication circuitry, and configured to:
control the communication circuitry to establish a communication connection with an external device;
control the communication circuitry to transmit first data related to a first application in a background state to the external device for displaying a first screen related to the first application on the external device;
control the display to display a second screen related to a second application with an object, wherein the object is displayed on the second screen and indicates that the first screen is being displayed on the external device based on the first data transmitted to the external device;
in response to obtaining a first input on the object, control the display to display a list of items including a first item; and
in response to the first item being selected, control the communication circuitry to transmit second data related to the second screen displayed on the mobile device instead of the first data to the external device for displaying a third screen on the external device, wherein the third screen corresponds to the second screen,
wherein the object includes an image associated with the external device.

2. The mobile device of claim 1, wherein the items include a second item for changing a device with which the communication circuitry establishes the communication connection, and
wherein the at least one processor is further configured to:
in response to the second item being selected, control the communication circuitry to establish a communication connection with another external device instead of the external device.

3. The mobile device of claim 2, wherein the image included in the object is changed to correspond to a type of the another external device.

4. The mobile device of claim 1, wherein the items include a second item for terminating the communication connection, and
wherein the at least one processor is further configured to:
in response to the second item being selected, control the communication circuitry to disconnect the communication connection with the external device.

5. The mobile device of claim 1, wherein the communication connection is a wireless connection, and wherein the third screen does not include the object.

6. The mobile device of claim 5, wherein the at least one processor is further configured to control the communication circuitry to establish the wireless connection using Bluetooth, BLE (Bluetooth Low Energy), Wi-Fi, or Wi-Fi direct.

7. The mobile device of claim 1, wherein the items include a second item for controlling the first application, and
wherein the at least one processor is further configured to,
in response to the second item being selected, control the communication circuitry to transmit a command for controlling the first application.

8. The mobile device of claim 7, wherein the first application is a video application, and
wherein the command is for pausing a content being reproduced by the video application on the external device.

9. The mobile device of claim 1, wherein the second screen includes wallpaper, and
wherein the object floats on the wallpaper.

10. The mobile device of claim 9, wherein, in response to a given input on the object, the object is moved from a first position to a second position on the wallpaper.

11. A method for a mobile device, the method comprising:
establishing, by communication circuitry of the mobile device, a communication connection with an external device;
transmitting, by the communication circuitry, first data related to a first application in a background state to the external device for displaying a first screen related to the first application on the external device;
displaying, by a display of the mobile device, a second screen related to a second application with an object, wherein the object is displayed on the second screen and indicates that the first screen is being displayed on the external device based on the first data transmitted to the external device;
in response to obtaining a first input on the object, displaying by the display a list of items including a first item; and
in response to the first item being selected, transmitting second data related to the second screen displayed on the mobile device instead of the first data to the external device for displaying a third screen on the external device, wherein the third screen corresponds to the second screen,
wherein the object includes an image associated with the external device.

12. The method of claim 11, wherein the items include a second item for changing a device with which the communication circuitry establishes the communication connection, and
wherein the method further comprises:
in response to the second item being selected, establishing, by the communication circuitry, a communication connection with another external device instead of the external device.

13. The method of claim 12, wherein the image included in the object is changed to correspond to a type of the another external device.

14. The method of claim 11, wherein the items include a second item for terminating the communication connection, and
wherein the method further comprises:
in response to the second item being selected, disconnecting, by the communication circuitry, the communication connection with the external device.

15. The method of claim 11, wherein the communication connection is a wireless connection, and wherein the third screen does not include the object.

16. The method of claim 15, wherein the wireless connection comprises a Bluetooth, a BLE (Bluetooth Low Energy), a Wi-Fi, or a Wi-Fi direct connection.

17. The method of claim 11, wherein the items include a second item for controlling the first application, and
wherein the method further comprises, in response to the second item being selected, transmitting, by the communication circuitry, a command for controlling the first application.

18. The method of claim 17, wherein the first application is a video application, and
wherein the command is for pausing a content being reproduced by the video application on the external device.

19. The method of claim 11, wherein the second screen includes wallpaper, and
wherein the object floats on the wallpaper.

20. The method of claim 19, further comprising, in response to a given input on the object, moving the object from a first position to a second position on the wallpaper.

* * * * *